US010812384B2

(12) United States Patent
Akers et al.

(10) Patent No.: US 10,812,384 B2
(45) Date of Patent: *Oct. 20, 2020

(54) CUSTOMER-SPECIFIED ROUTING POLICIES

(71) Applicant: Amazon Technologies, Inc., Seattle, WA (US)

(72) Inventors: Kyle Tailor Akers, Sterling, VA (US); Chao Yuan, Arlington, VA (US); Kevin Christopher Miller, Fairfax, VA (US); Andrew Bruce Dickinson, Seattle, WA (US); Michael Siaosi Voegele, Bethesda, MD (US); Daniel Lee McCarriar, Arlington, VA (US); Yohanes Santoso, Sterling, VA (US); David Brian Lennon, Reston, VA (US)

(73) Assignee: Amazon Technologies, Inc., Seattle, WA (US)

( * ) Notice: Subject to any disclaimer, the term of this patent is extended or adjusted under 35 U.S.C. 154(b) by 183 days.

This patent is subject to a terminal disclaimer.

(21) Appl. No.: 16/025,822

(22) Filed: Jul. 2, 2018

(65) Prior Publication Data

US 2018/0316612 A1 Nov. 1, 2018

Related U.S. Application Data

(63) Continuation of application No. 14/745,220, filed on Jun. 19, 2015, now Pat. No. 10,015,094.

(51) Int. Cl.
  *G06F 15/173* (2006.01)
  *H04L 12/741* (2013.01)
  *H04L 29/12* (2006.01)

(52) U.S. Cl.
  CPC ........ *H04L 45/745* (2013.01); *H04L 61/1511* (2013.01); *H04L 61/6068* (2013.01)

(58) Field of Classification Search
  CPC . H04L 45/745; H04L 61/6068; H04L 61/1511
  See application file for complete search history.

(56) References Cited

U.S. PATENT DOCUMENTS

| | | | |
|---|---|---|---|
| 2011/0154477 A1 | 6/2011 | Parla et al. | |
| 2012/0131096 A1* | 5/2012 | Bugenhagen | G08B 25/08 709/203 |

(Continued)

OTHER PUBLICATIONS

"Squid (software)," http://en/wikipedia.org/wiki/Squid_(software); downloaded Apr. 24, 2015.

*Primary Examiner* — Padma Mundur

(74) *Attorney, Agent, or Firm* — Robert C. Kowert; Kowert, Hood, Munyon, Rankin & Goetzel, P.C.

(57) ABSTRACT

Techniques are described for managing customer-specified routing policies for network-accessible computing resources. In some situations, the customer-specified routing policies may be based at least in part on DNS ("Domain Name System") information specified by a customer, such as if the customer specifies one or more target destinations to use with an indicated DNS domain name that are different from the destination IP address(es) provided for that DNS domain name by DNS servers—if so, the managing of such a DNS-based routing policy for that customer may include identifying when network-accessible computing resources provided to the customer send electronic communications to that DNS domain name, and causing those electronic communications to be redirected to the customer-specified target destination(s). Such customer-specified target destinations may include, in different situations, final destinations, intermediate destinations, etc., as well as identify particular routes.

20 Claims, 8 Drawing Sheets

(56) References Cited

U.S. PATENT DOCUMENTS

| | | |
|---|---|---|
| 2013/0058346 A1 | 3/2013 | Sridharan et al. |
| 2013/0173694 A1 | 7/2013 | Arsenault |
| 2015/0333980 A1 | 11/2015 | Martini |
| 2015/0350153 A1 | 12/2015 | Layman et al. |
| 2016/0248703 A1 | 8/2016 | Gopalakrishnan et al. |

\* cited by examiner

CUSTOMER-SPECIFIED ROUTING POLICIES

CROSS-REFERENCE TO RELATED APPLICATIONS

This application is a continuation of U.S. patent application Ser. No. 14/745,220, filed Jun. 19, 2015 and entitled "Customer-Specified Routing Policies," which is hereby incorporated by reference in its entirety.

BACKGROUND

Many companies and other organizations operate computer networks that interconnect numerous computing systems to support their operations, with the computing systems being alternatively co-located (e.g., as part of a private local area network, or "LAN") or instead located in multiple distinct geographical locations (e.g., connected via one or more other private or shared intermediate networks). For example, data centers housing significant numbers of interconnected co-located computing systems have become commonplace, such as private data centers that are operated by and on behalf of a single organization, as well as public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers and computer networks has increased, the task of provisioning, administering, and managing the associated physical computing resources has become increasingly complicated.

The advent of virtualization technologies for commodity hardware has provided some benefits with respect to managing large-scale computing resources for many customers with diverse needs, allowing various computing resources to be efficiently and securely shared between multiple customers. For example, virtualization technologies such as those provided by VMWare, XEN, Linux's KVM ("Kernel-based Virtual Machine"), or User-Mode Linux may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines.

DETAILED DESCRIPTION

Figure 1:
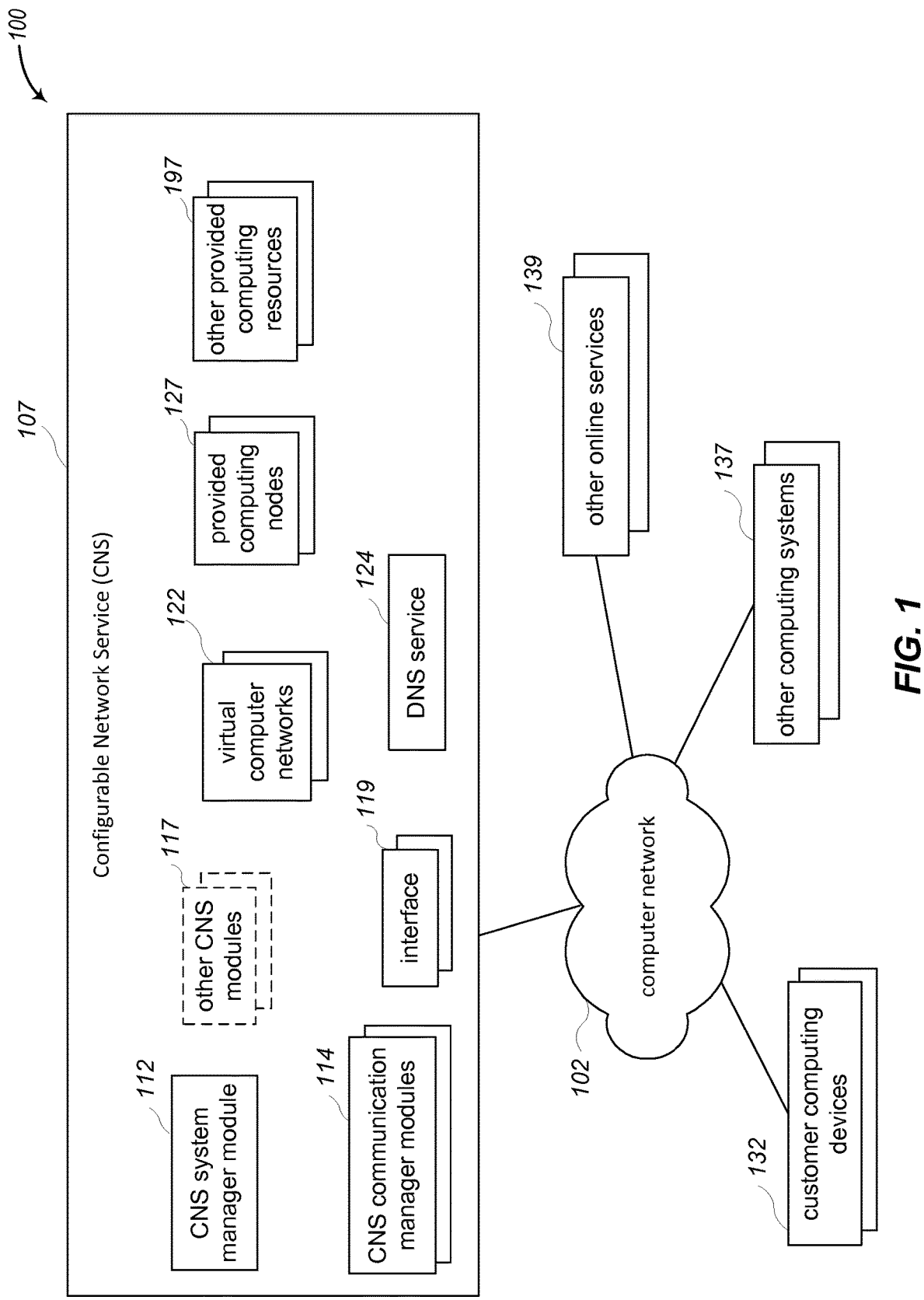
FIG. 1 is a network diagram illustrating an example environment in which techniques for managing customer-specified routing policies for network-accessible computing resources may be used.

Techniques are described for managing customer-specified routing policies for network-accessible computing resources, such as for computing nodes and/or virtual computer networks provided by a service provider. In some embodiments, the customer-specified routing policies may be based at least in part on DNS ("Domain Name System") information specified by a customer, such as if the customer specifies one or more target destinations to use with an indicated DNS domain name that are different from the destination IP ("Internet Protocol") address(es) provided for that DNS domain name by DNS servers. In one embodiment, the managing of such a DNS-based routing policy for that customer may include identifying when network-accessible computing resources provided to the customer send electronic communications to that DNS domain name, and causing those electronic communications to be redirected to the customer-specified target destination(s). In some embodiments, the customer-specified routing policies may relate to virtual computer networks provided by a configurable network service (CNS) operated by the service provider, with each virtual computer network having one or more computing nodes. In such embodiments, a CNS system implementing the CNS service may perform at least some of the described techniques for its customers using one or more modules of the CNS system, as described in greater detail below.

As one illustrative example of use of the described techniques, a computing node of a customer (e.g., a virtual machine instance) may want to send a communication to a destination identified by a DNS domain name. If so, the computing node first queries a DNS server to obtain a corresponding destination IP address for that DNS domain name, which may be one of a plurality of IP addresses used by the DNS server for that DNS domain name, and with the DNS servers using various techniques to select a particular one of the IP addresses to use in responding to the computing node (e.g., a random selection, using round robin rotation, to balance load between multiple servers associated with the plurality of IP addresses, etc.). Once the computing node receives the corresponding destination IP address for the DNS domain name, it then generates and sends one or more outgoing communications (e.g., one or more packets) with that IP address as the destination IP address of the outgoing communication(s).

A CNS communication manager module associated with the computing node then intercepts the outgoing communication, such as prior to the communication being transmitted from a physical computing machine that hosts the computing node. As discussed in greater detail below, the computing node may in some embodiments be implemented as a virtual machine instance hosted on the physical computing machine, and the CNS communication manager module may be implemented as part of a hypervisor monitor or privileged virtual machine (sometimes referred to as a "Dom0") that manages the hosted virtual machines on the computing machine and/or as part of an intelligent NIC ("network interface controller or card") that connects the computing machine to a computer network external to the computing machine. The CNS communication manager module then identifies a DNS domain name corresponding to the destination IP address used in the outgoing communication, such as by performing a reverse DNS lookup—in this manner, any of the plurality of the IP addresses associated with the DNS domain name may be used to identify the DNS domain name. In at least some embodiments, the reverse DNS lookup is performed using information that is locally stored on the physical computing machine, such as to provide a rapid response to the lookup and/or to allow some or all computing nodes to have different (e.g., customized) local information used as part of its reverse DNS lookup operations. Such locally stored information used for the reverse DNS lookup may include mappings from some or all of the plurality of IP addresses to the original DNS domain name, and is referred to generally herein as DNS mapping information. In addition, the communication manager module and/or computing machine may obtain and store such local DNS mapping information in various manners, as discussed in greater detail below.

After identifying the DNS domain name from the reverse DNS lookup, the CNS communication manager module then further determines a new target destination that is associated with the DNS domain name but different from the destination IP address used by the computing node in the outgoing communication (e.g., different from all of the plurality of IP addresses associated with the DNS domain name by the DNS servers), and modifies the destination of the outgoing communication to be the new target destination before forwarding the modified outgoing communication externally to the computing machine toward that new target destination. As described in greater detail below, the new target destination may be a customer-specified target destination for the obtained DNS domain name that is used with some or all computing nodes used by the customer, and may have a variety of forms (e.g., a different IP address, a different DNS domain name, etc.). In some embodiments, the CNS communication manager module may again use locally stored information on the computing machine to determine the customer-specified target destination, such as in information that associates that original DNS domain name to the customer-specified target destination and that is referred to generally herein as route mapping information, with such locally stored information used to provide a rapid response to the determination and/or to allow some or all computing nodes to have different (e.g., customized) customer-specified target destination for the obtained DNS domain name.

The route mapping information to use for a particular customer of the CNS service and/or provided computing node(s) may be determined in various manners, such as to be explicitly configured by the customer, although the CNS system may automatically determine some or all target destinations for some or all DNS domain names and customers in other embodiments. For example, the customer may utilize a graphical user interface ("GUI") and/or an application programming interface ("API") provided by the CNS system to specify a target destination to use for a corresponding DNS domain name, such as for all computing nodes used by the customer, for a specific such computing node, for groups of related computing nodes (e.g., all computing nodes that are part of a subnet of a virtual computer network being provided to the customer), etc. In addition, the customer may specify particular target destinations for particular DNS domain names to obtain a variety of benefits. For example, an online service associated with a particular DNS domain name may provide multiple different types of functionality to different customers (e.g., may have regional or other geographic-specific sub-domains), and the customer may specify a target destination for that DNS domain name that corresponds to a particular one of the multiple available functionalities (e.g., to a more specific or otherwise different DNS domain name or destination IP address that corresponds to a particular region or other geographic-specific sub-domain). Alternatively, or in addition, the customer may want to route communications destined for a particular DNS domain name through a particular intermediate computing device or other intermediate network endpoint (e.g., to obtain some information regarding the communications going to the particular DNS domain name), and if so may specify a target destination for that DNS domain name that corresponds to that intermediate computing device or other network endpoint, while communications destined for other DNS domain names may be routed through a different computing device or intermediate network endpoint (e.g., that does not obtain information, or obtains different information, regarding those communications going to the other DNS domain names). One example of such an intermediate network endpoint is if the CNS service (or another customer of the CNS service) provides a specialized connection to a particular other online service using that DNS domain name, such as with the specialized connection providing advantages over default routing over the Internet (e.g., use of one or more internal networks or connections of the CNS service that provide benefits with respect to one or more of speed, latency, reliability, cost, etc.), and optionally in situations in which the other online service is affiliated with the CNS service (e.g., provided or operated by the same entity). Another example of such an intermediate network endpoint is if the customer controls other computing resources external to the CNS service and specifies a target destination for a particular DNS domain name to route communications for that DNS domain name to one or more of those other external computing resources. It will be appreciated that various other types of customer-specified route mapping information may be used in other embodiments to provide various other benefits.

For illustrative purposes, some embodiments are described below in which specific types of DNS mapping information and route mapping information are employed, in which the information is used in specific manners, and in which such techniques are performed by an online service that provides virtual computer networks and optionally other computing resources to customers. These examples are provided for illustrative purposes and are simplified for the sake of brevity, and the inventive techniques may be used in a wide variety of other situations, including with other types of online services and for computing resources that are not provided by an online service, some of which are discussed below.

FIG. 1 is a network diagram illustrating an example of a network-accessible configurable network service (CNS) that provides customer-configurable managed computing nodes and virtual computer networks to customers. After such a managed computing node and virtual computer network is configured and provided by the CNS service for a customer of the CNS service, the customer may interact from one or more remote locations with the provided computing nodes and virtual computer network, such as to execute programs on the computing nodes of the provided virtual computer network, to dynamically modify the provided virtual computer network or the computing nodes of the virtual computer network while it is in use, etc. The described techniques for managing customer-specified routing policies for network-accessible computing resources and associated functionality may be used in some embodiments with such a CNS service, as discussed in greater detail elsewhere herein, including with respect to the examples of FIGS. 2A-2C and the flowcharts illustrated and described in conjunction with FIGS. 4 and 5A-5B.

In particular, example system 100 of FIG. 1 includes a CNS service 107 implemented using one or more configured computing systems (not shown) to provide functionality over one or more computer networks 102 (e.g., over the Internet) to customers (not shown) using customer computing devices 132. In various embodiments, the CNS service 107 may be an online service, a web-based service (also referred to herein as a web service), etc. The CNS service 107 enables the customers to access and use virtual computer networks provided to the customers by the CNS service. For example, a number of customers interact over the public network 102 with a CNS system manager module 112 of the CNS service 107 to create and configure various managed virtual computer networks 122 being provided by the CNS service 107. In this example embodiment, the CNS system manager module 112 assists in providing functionality of the CNS service 107 to the remote customers along with various provided computing nodes 127 or other provided computing resources 197 (e.g., substrate network hardware router devices, hardware edge devices, etc.) that are used by the CNS service 107 to provide the managed virtual computer networks 122. Each computing node 127 may in some embodiments be implemented as a virtual machine that is hosted or otherwise managed by a computing machine (not shown) of the CNS service 107, and may be in at least one of the virtual computer networks 122. In addition, multiple CNS communication manager modules 114 are provided that further assist in providing functionality of the CNS service 107 to the remote customers, such as with each CNS communication manager module 114 being associated with one or more of the provided computing nodes 127 in order to manage communications to and from those provided computing systems. Various optional other CNS modules 117 of the CNS service 107 (e.g., various manager modules in one or more data centers, customer modules on customer computing devices of the customers, etc.) may also be provided and used in some embodiments and situations.

In at least some embodiments, the CNS system manager module 112, CNS communication manager modules 114 and at least some other optional CNS modules 117 may execute on one or more computing systems (not shown) of the CNS service 107, and may provide one or more APIs (application programming interfaces) that enable remote computing systems to programmatically interact with the CNS service to access some or all functionality of the CNS service 107 on behalf of customers (e.g., to create, configure, and/or initiate use of managed virtual computer networks 122), such as via a provided interface 119 of the CNS service 107. In addition, in at least some embodiments, customers may instead manually interact with the CNS service 107 (e.g., via a GUI provided by the CNS system manager module 112, such as via another provided interface 119; via customer modules, not shown, of the CNS service executing on the customer computing devices 132; etc.) to perform some or all such actions.

The computer network 102 may be, for example, a publicly accessible network of linked networks, possibly operated by distinct parties, such as the Internet. Similarly, the CNS service 107 may include one or more internal networks (not shown) for connecting computing systems of the CNS service 107 to each other, such as internal networks that are separate and distinct from the computer network 102. The computer network 102 may also provide customers with the ability to access other online services 139 to provide other functionality.

In this example, the CNS service 107 further provides a DNS service 124 that maintains DNS mapping information (e.g., DNS domain name-to-IP address mappings for one or more distinct DNS domain names and one or more distinct destination IP addresses) for use by managed virtual computer networks 122 and provided computing nodes 127, although in other embodiments such a DNS service may instead be provided as an external online service 139 that is accessible by both the CNS service 107 and other users external to the CNS service.

In some embodiments, each computing machine (not shown) of the CNS service 107 includes a CNS communication manager module 114 for managing communications between computing nodes 127 hosted by that computing machine and other external destination devices. The CNS communication manager module 114 receives outgoing communications from a provided computing node 127 that it manages, and determines the destination IP address of the outgoing communication. The CNS communication manager module 114 then utilizes DNS mapping information and configured route mapping information to determine specific route information for forwarding the outgoing communication to the destination. The CNS communication manager module 114 modifies the outgoing communication to use a specified target destination based on the configured route mapping information for the specific DNS domain name associated with the destination IP address of the outgoing communication. In some embodiments, the CNS communication manager module 114 modifies the original destination IP address and/or encapsulates the outgoing communication (e.g., encapsulating the outgoing communication with a new header whose destination information corresponding to the target destination) as appropriate based on the specific route information. The CNS communication manager module 114 then forwards the modified outgoing communication to the target destination configured for the customer. In some embodiments where the outgoing communication is encapsulated with destination information corresponding to an intermediate target destination, and further includes additional information corresponding to a subsequent final target destination, the intermediate destination receives the forwarded modified outgoing communication, further modifies the received modified outgoing communication to remove information added to the modified outgoing communication as part of the encapsulation information, and forwards the further modified outgoing communication to the subsequent final target destination.

In some embodiments, a customer may provide at least some DNS mapping information to use with one or more virtual computer networks 122 or computing nodes 127 that are provided by the CNS service for the corresponding customer, such as if the customer specifies a particular group of IP addresses to use with a particular DNS domain name for that customer's provided computing nodes 127. In at least one such embodiment, the customer may provide the DNS mapping information to the CNS service 107 via a provided interface 119, such as for storage on computing machines hosting corresponding computing nodes 127 provided to the customer and/or to provide to the DNS service 124 (e.g., if the DNS service stores and provides customer-specific DNS information). Alternatively, the customer may instead provide such information directly to the DNS service 124 in some embodiments, with the DNS service 124 distributing DNS mapping information to corresponding computing machines of the CNS service 107 for use with computing nodes 127 provided to the customer. In some embodiments, the CNS service 107 and/or DNS service 124 may further implement additional or different functionality than typical DNS service functionality. For example, the CNS service 107 may modify DNS mapping information based on internal networking characteristics (e.g., network utilization, bandwidth constrains, current or predicted traffic flows, etc.) of the CNS service 107 or operating characteristics (e.g., available computing resources, current or predicted resource utilization, etc.) of the computing systems implementing the CNS service 107. In other embodiments, DNS mapping information used by particular computing nodes of the CNS service may be obtained from a DNS service (e.g., a DNS service that is external to the CNS service 107, such as another online service 139 that provides DNS service functionality to various different requesting computing devices), whether by requesting or otherwise retrieving that information directly from the DNS service as part of initial configuration activities, or by incrementally identifying such information by monitoring DNS lookup requests made by provided computing nodes 127 to the DNS service (e.g., to identify particular DNS domain names to track) and the corresponding responses from the DNS service (e.g., to identify particular destination IP addresses that the DNS service provides for those particular DNS domain names, whether to any provided computing node 127 or to particular provided computing nodes 127). Use of DNS mapping information by computing machines of the CNS service to provide DNS-based routing for network-accessible computing resources is further illustrated and described in greater detail elsewhere herein, including with respect to the examples of FIGS. 2A-2C.

In some embodiments, DNS mapping information may be stored as a table that includes entries that associate IP addresses with DNS domain names, which are used in reverse DNS lookups to determine a specific DNS domain name that is associated with a destination IP address of an outgoing communication from a computing node. The CNS service 107 may maintain an aggregated DNS mapping table (not shown) for use with each computing node 127 for each customer of the CNS service 107. The CNS service 107 may in some embodiments further—periodically or upon a change to the DNS mapping information—provide the DNS mapping information to each CNS communication manager module 114 of each computing machine for storage on the associated computing machine, so that each CNS communication manager module 114 can locally perform a reverse DNS lookup without accessing any other computing systems. In some embodiments, the described techniques may use the typical DNS mapping information that is provided by a DNS service to any requester, while in other embodiments, at least some of the DNS mapping information may be specified by customers and/or determined by the CNS service 107. Thus, customers may be provided an interface in which they can manipulate, change, modify, or create one or more entries in the DNS mapping information, which may be provided to only those computing machines hosting computing nodes 127 provided to that customer for use with those computing nodes provided to that customer. In this way, customers may have individualized DNS mapping information for the computing nodes provided to them by the CNS service.

Figure 2A:
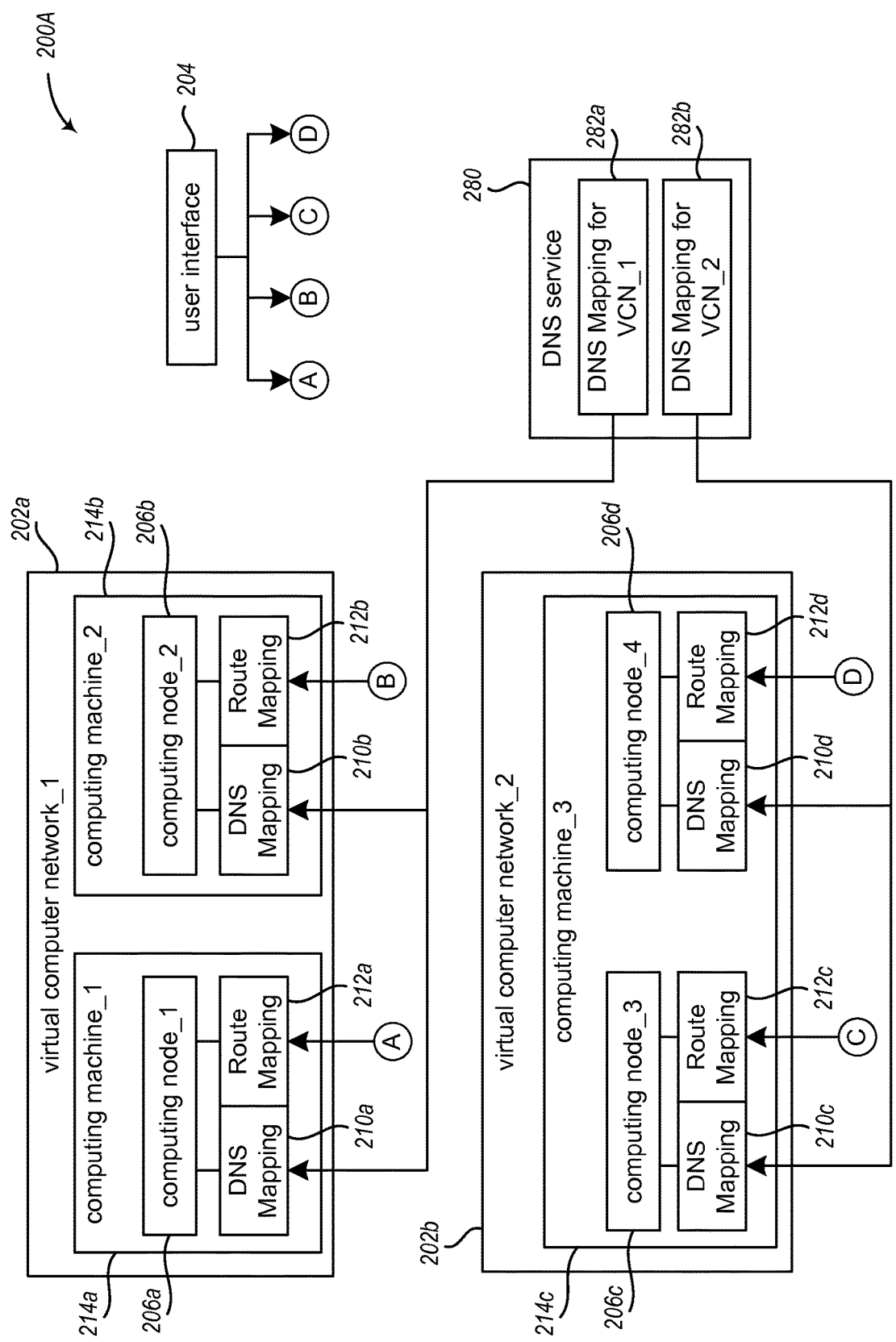
FIGS. 2A-2C illustrate examples of managing customer-specified routing policies for network-accessible computing resources.
Figure 2B:
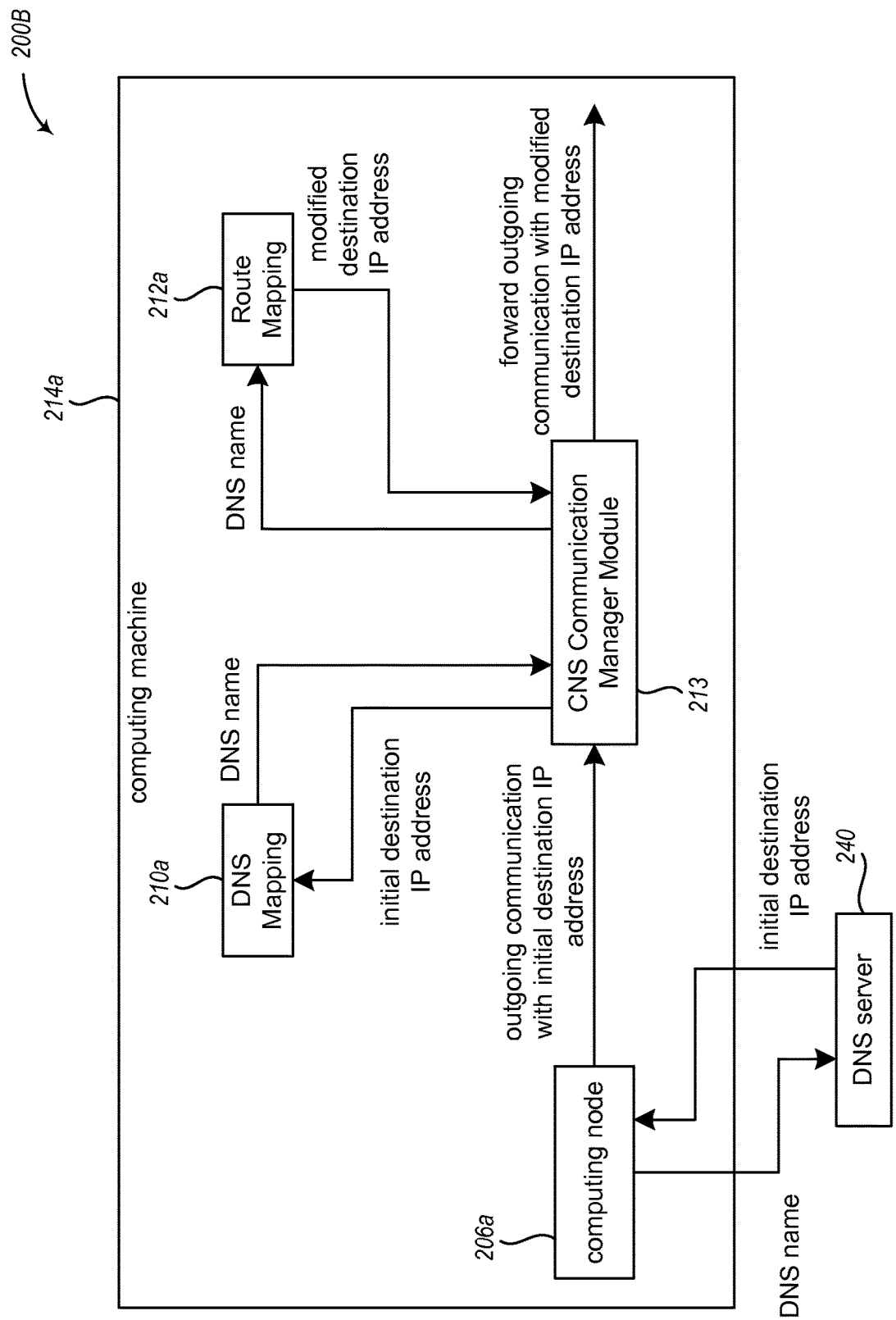
Figure 2C:
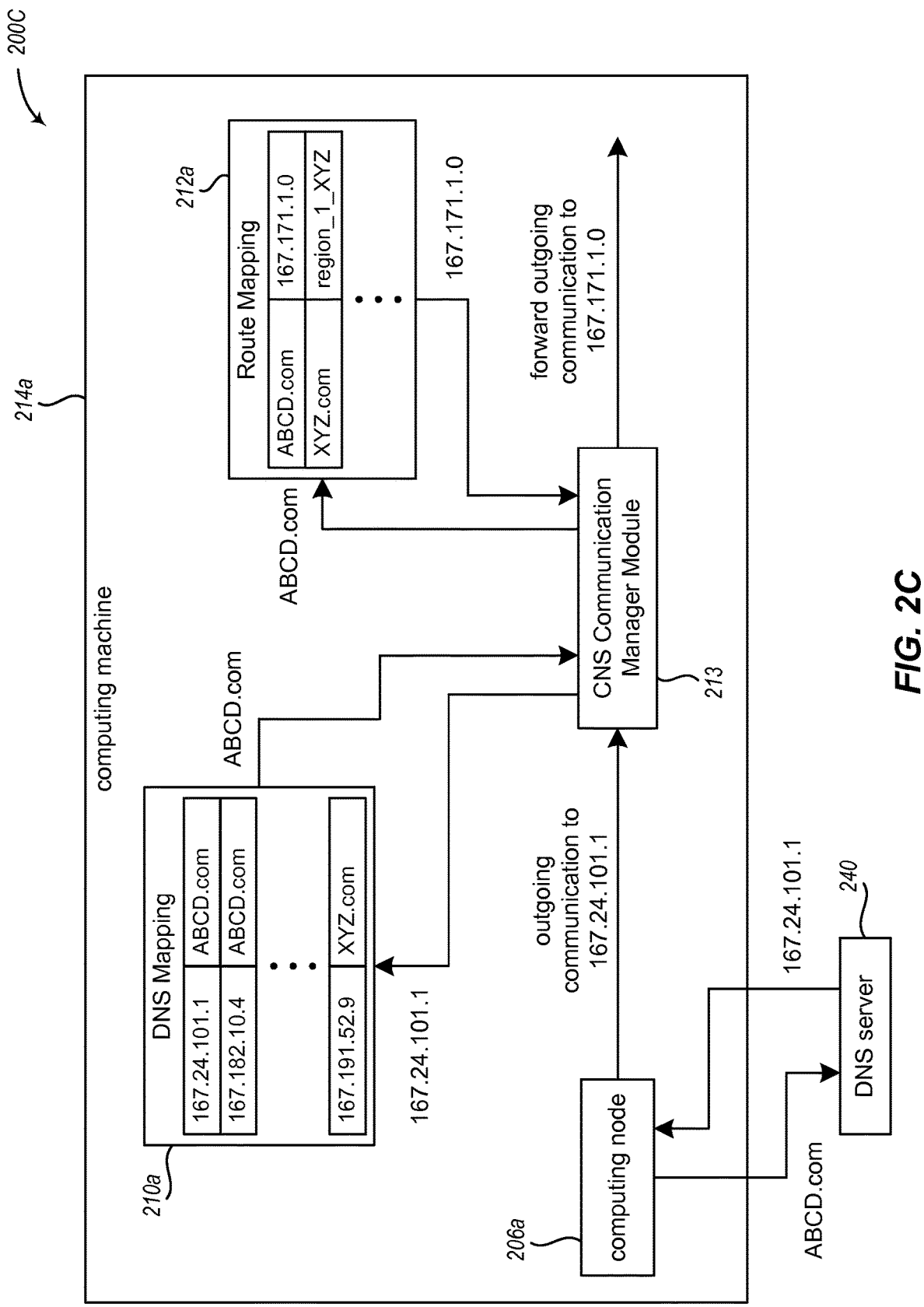

Additionally, a customer may interact with the CNS system manager module 112 to provide route mapping information for virtual computer networks 122 or computing nodes 127 provided for the customer, as illustrated and described in greater detail elsewhere herein, including with respect to the examples of FIGS. 2A-2C. The route mapping information may be stored on the computing machines that host the provided computing nodes 127 and accessed to provide intermediate destination route information for which to forward communications based on a DNS domain name associated with the communications.

In some embodiments, route mapping information may be stored as a table that includes entries that maps DNS domain names to associated target destinations, such as for use in determining a specific route to use for an outgoing communication based on the DNS domain name obtained from the reverse DNS lookup. The routing information may identify one or more target destinations for a DNS domain name that in some embodiments include at least one intermediate route destination. The target destination may, for example, identify an IP address (e.g., an IP address that is distinct from the initial destination IP address of the outgoing communication), a specified DNS domain name (e.g., a DNS domain name that corresponds to one subpart of a plurality of subparts of an external online service associated with the original DNS domain name), a network endpoint (e.g., an endpoint of a connection configured over an internal network of the CNS service 107 to a second online service, such that the outgoing communication is forwarded to the endpoint without passing over any public networks external to the online service; an endpoint that is located in a virtual computer network of another customer and is made available by that other customer for use by others, such that the outgoing communication is forwarded using peer routing information from the customer's virtual computer network to the endpoint in the other customer's virtual computer network, etc.), etc. In other embodiments, the routing information may otherwise identify a route or path through a plurality of intermediate destination devices from the originating computing node to the destination. In yet other embodiments, the routing information may identify other servicers or networks via which to forward outgoing communications en route to a destination. In some embodiments, the target destination may be an edge device that connects an internal network of the CNS service to one or more external public networks, such that an outgoing communication is forwarded over the internal network to the edge device to enable the outgoing communication to be further forwarded to a specified other online service over the one or more public networks.

The route mapping information may be determined, provided, modified, or otherwise customized by a customer through an API, GUI, or other interface. The customer may provide configuration information for use with one or more computing nodes 127 (which may be implemented by one or more virtual machines) of the CNS service 107 provided to the customer, where the configuration information may be used to configure a virtual computer network 122 to be provided to the user by the CNS service 107 (such that the CNS service assigns a plurality of computing nodes provided by the CNS service to be part of the virtual computer network for the user), specify multiple subnets of the virtual computer network that each includes a distinct subset of the plurality of computing nodes, etc. The configuration information may also include the route mapping information for each separate computing node, each separate virtual computer network, among a group of multiple virtual computer networks, a sub-network of a plurality of computing nodes within a virtual computer network, etc. for computing resources provided by the CNS service to that customer. In this way, each customer can determine a distinct or specific manner for routing communications to a destination.

In other embodiments, the CNS service 107 may automatically determine the route mapping information, which may be separately determined for each separate customer, for a group or sub-group of customers (e.g., based on a geographical location of the customers), etc. In this way, the CNS service 107 can provide different routing information to different customers based on an amount each customer pays for the CNS service 107 (e.g., provide more geographically direct routes or routes that utilize intermediate destination devices that have more computing resources for customers that pay more than other customers), based on network traffic characteristics at different times of day (e.g., load balance communications across multiple intermediate destination devices during high traffic periods of time), etc. The route mapping information stored on the computing machine of an associated computing node may be used by a CNS communication manager module executing on that computing machine to manage other computing node(s) hosted on that computing machine.

Additionally, each of the provided virtual computer networks 122 may be configured in various ways by the customers for whom they are provided. In some situations, at least some such virtual computer networks may be created and configured as network extensions to existing remote private computer networks of customers, although in the illustrated embodiment the provided virtual computer networks 122 are not shown to be connected to such other existing computer networks. In addition, at least some such virtual computer networks may each be a private computer network that is accessible only by the customer that creates it, although in other embodiments at least some computer networks provided by the CNS service 107 for customers may be publicly accessible.

In the illustrated example, each of the provided computer networks 122 includes multiple computing nodes (not shown), at least some of which are from the plurality of computing nodes 127 provided by or otherwise under the control of the CNS service 107, while in other embodiments at least some other computing systems 137 may be used to provide some or all computing nodes for one or more of the provided virtual computer networks 122—such other computing systems 137 may, for example, be provided by or under control of the customer for whom a virtual computer network 122 that uses those other computing systems 137 is provided, or may be computing systems that are provided by third parties (e.g., for a fee). For example, in at least some embodiments, each provided virtual computer network 122 may include a customer-configured quantity of multiple such computing nodes that are dedicated for use as part of that provided computer network. In particular, a customer may interact with the CNS system manager module 112 to configure a quantity of computing nodes to initially be included in a computer network provided for the customer (e.g., via one or more programmatic interactions with an API provided by the CNS service 107).

In addition, the CNS service 107 may provide multiple different types of computing nodes in at least some embodiments, such as, for example, computing nodes with various performance characteristics (e.g., processor speed, memory available, storage available, etc.) or other capabilities. If so, in at least some such embodiments, a customer may specify the types of computing nodes to be included in a provided computer network for the customer. In addition, in at least some embodiments, a customer may interact with the CNS system manager module 112 and the DNS service 124 to configure network addresses for a computer network provided for the customer (e.g., via one or more programmatic interactions with an API provided by the CNS service 107), and network addresses may later be dynamically added, removed or modified for a provided computer network of a customer in at least some such embodiments, such as after the provided computer network has already been in use by the customer.

Furthermore, in at least some embodiments, a customer may interact with the CNS system manager module 112 to configure network topology information for a computer network provided for the customer (e.g., via one or more programmatic interactions with an API provided by the CNS service 107), including to specify one or more virtual router devices or other virtual networking devices for the provided computer network, and such network topology information may later be dynamically modified for a provided computer network in at least some such embodiments, such as after the provided computer network has already been in use by the customer. In various embodiments, this configurable network topology information is provided to the computing machines that host the provided computing nodes 127 provided for the customer.

Moreover, in at least some embodiments, a customer may interact with the CNS system manager module 112 to configure various network access constraint information for a computer network provided for the customer (e.g., via one or more programmatic interactions with an API provided by the CNS service 107), and such network access constraint information may later be dynamically modified for a provided computer network in at least some such embodiments, such as after the provided computer network has already been in use by the customer.

In addition, in at least some embodiments, the computing nodes of the managed virtual computer networks 122 may be physical computing systems or may be virtual machines that are each hosted on one or more physical computing systems or physical computing machines, and the communications that are handled for managed virtual computer networks may include transmissions of data (e.g., messages, packets, frames, streams, etc.) in various formats. Furthermore, in at least some situations, an embodiment of the CNS system may be part of or otherwise affiliated with a program execution service (or "PES") that executes multiple programs on behalf of multiple customers or other users of the service, such as a program execution service that uses multiple computing systems on multiple physical networks (e.g., multiple physical computing systems and networks within a data center). Thus, managed virtual computer networks 122 may be provided for customers in various manners in various embodiments, and may be configured to have various types of functionality in various embodiments.

FIGS. 2A-2C illustrate examples of managing customer-specified routing policies for network-accessible computing resources, such as may be provided by the CNS service of FIG. 1. As described herein, the CNS service provides computing nodes configured in virtual computer networks to customers of the CNS service.

FIG. 2A illustrates example system 200A, which includes virtual computer networks 202 (e.g., in a manner similar to virtual computer networks 122 of FIG. 1), user interface 204 (e.g., in a manner similar to interface 119 of FIG. 1), and DNS service 280 (e.g., in a manner similar to DNS service 124 of FIG. 1). The illustrated virtual computer networks may be provided for one or more customers of the CNS service, such as with both virtual computer networks 202a-b being provided to Customer_A, or with the virtual computer network 202a being provided to Customer_A and the virtual computer network 202b being provided to Customer_B. Each of the virtual computer networks 202a-b includes the computing nodes 206a-d (e.g., similar to provided computing nodes 127 of FIG. 1) in this example that are hosted by one or more computing machines 214a-c of the CNS service.

The computing machines 214a-c are physical computing machines, such as may be located in one or more computer racks located in a data center, or instead be stand-alone desktop or server computing machines. The number of computing machines may be more or less than what is illustrated in FIG. 2A. The computing machines 214a-c in this example each provides one or more virtual machines, which each may be employed to provide an independent computing environment to host applications for a customer of the CNS service, and thus to act as distinct computing nodes 206a-d (e.g., one of the provided computing nodes 122 of FIG. 1A). In addition, the computing machines 214a-c each execute a CNS communication manager module (e.g., in a manner similar to CNS communication manager modules 114 of FIG. 1) that manages the computing nodes 206 hosted on that computing machine, such as by acting as a hypervisor or machine monitor for those virtual machines, although the CNS communication manager modules are not illustrated in the example of FIG. 2A—in some embodiments, the CNS communication manager modules are configured by the CNS service to further support the functionality provided by the CNS service in various manners (e.g., to manage communications to and from the hosted virtual machine computing nodes that they manage in such a manner as to implement functionality of the virtual computer networks to which those computing nodes belong).

Each of the computing machines 214a-c hosts one or more computer nodes 206a-d—for example, as illustrated, computing machine 214a hosts computing node 206a, computing machine 214b hosts computing node 206b, and computing machine 214c hosts computing nodes 206c and 206d. As described in more detail with respect to FIG. 2B, each of the computing machines 214a-c maintains the route mapping information 212a-d and the DNS mapping information 210a-d for each computing node 206 that it is hosting. Thus, each computing node 206a-d is associated with respective route mapping information 212a-d and DNS mapping information 210a-d, with computing node 206a being associated with DNS mapping information 210a and route mapping information 212a, computing node 206b being associated with DNS mapping 210b information and route mapping information 212b, computing node 206c being associated with DNS mapping information 210c and route mapping information 212c, and computing node 206d being associated with DNS mapping information 210d and route mapping information 212d.

In this example, the DNS service 280 maintains different DNS mapping information 282a-b for different virtual computer networks and/or their computing nodes, although in other embodiments all virtual computer networks and computing nodes may instead receive the same information from the DNS service. The DNS mapping information 282a-b includes relationships or mappings between one or more DNS domain names and one or more IP addresses (network addresses of various destination computing machines or computing systems within the local network of the CNS service or accessible to the CNS service via a public network). In this example, DNS service 280 maintains DNS mapping information 282a for virtual computer network 202a and DNS mapping information 282b for virtual computer network 202b. In another embodiment, the DNS service 280 may maintain DNS mapping information at the customer level such that the DNS mapping information provided to each computing machine for each virtual computer network provided for a corresponding customer is the same for that customer, but that separate DNS mapping information may be maintained for different customers. Similarly, the DNS service 280 may maintain DNS mapping information at the level of particular computing nodes or groups of computing nodes (e.g., for a subnet of a virtual computer network), such that each computing node or computing node group may have different DNS mapping information. In yet other embodiments, the DNS service 280 may aggregate DNS mapping information for a plurality of different virtual computer networks for one or more customers into a unified DNS mapping table, such that the same DNS mapping information is provided to the computing machines for each virtual computer network provided for each customer of the CNS service.

The DNS service 280 provides DNS mapping information 282a-b to each computing machine 214a-c for storage as DNS mapping information 210a-d, such as a subset of the DNS service information that is specific to that computing machine. In this way, each computing machine maintains a local copy of the DNS mapping information, such as to enable reverse DNS lookups to be performed local to the computing machine without accessing the DNS service or other remote service to perform the reverse DNS lookup. For example, computing machine 214a stores DNS mapping information 210a for computing node 206a, computing machine 214b stores DNS mapping information 210b for computing node 206b, computing machine 214c stores DNS mapping information 210c for computing node 206c and DNS mapping information 210d for computing node 206d (noting that DNS mapping information 210c and 210d may be the same in some situations).

In various embodiments, the DNS service 280 provides the DNS mapping information 282a-b to the computing machines 214a-c at predetermined time intervals (e.g., once a day, once an hour, etc.), when the DNS mapping information changes (e.g., a customer provides a customized DNS mapping entry; the CNS service adds, removes or changes a DNS mapping entry; etc.), etc. For example, the computing machines 214a-c can be configured to send a request to the CNS service or the CNS service may push DNS mapping information to the computing machines 214a-c. In some embodiments, the DNS service 280 may provide updated DNS mapping information to only those computing machines affected by a change in the DNS mapping information (e.g., if a customer customizes a DNS mapping entry, then the DNS service 280 provides updated DNS mapping information to only those computing machines that are hosting computing nodes provided for that customer). In various embodiments, the DNS service 280 and/or computing machines 206 may further include or maintain time-to-live (or TTL) values or other expiration information that indicates when corresponding DNS information 282 and/or DNS mapping information 210 is no longer valid. If a particular DNS entry or other group of DNS information expires, the DNS service 280 and/or computing machines 206 may update the stored mapping information 282 and/or DNS mapping information 210 based on the expiration, such as to remove expired information from DNS mapping information 210, request new information to be added to DNS mapping information 210 corresponding to the expired information, etc. In this way, the local copies of the DNS mapping information may be updated when DNS domain name-to-IP address information expires. In addition, one or more CNS modules may further operate in some embodiments to maintain route mapping information 212 in synchronization with corresponding DNS information 282 and/or DNS mapping information 210—for example, a CNS communication manager module (not shown) executing on one of the computing machines 206 may maintain synchronization between the DNS mapping information 210 and the route mapping information 212 stored on that computing machine. If a DNS entry in information 210 on that computing machine expires, which had mapped a particular DNS domain name to one or more destination IP addresses, the CNS communication manager module on that computing machine may, for example, update corresponding information for the route mapping information 212 on that computing machine, such as to expire and/or remove route mapping information corresponding to that DNS domain name and/or those one or more destination IP addresses, to request new information for the DNS entry and update the corresponding route mapping information to reflect any changes, etc.

The user interface 204 of FIG. 2A provides customers with an interface (e.g., an API or a GUI) for which to provide customized route mapping information 212a-d (or DNS mapping information 210a-d) for some or all computing nodes provided by the CNS service for that customer. The route mapping information 212a-d includes relationships or mappings between one or more DNS domain names and one or more target routing destinations (e.g., destination IP addresses, different DNS domain names, etc.). In some embodiments, the route mapping information 212a-d may include relationships or mappings between one or more DNS domain names and a route that includes one or more intermediate routing destinations to be used in routing an outgoing communication from a computing node to a target destination associated with the DNS domain name.

Similar to the DNS mapping information 282a-b, the route mapping information 212a-d may be customized for each separate computing node, each separate virtual computer network, a sub-network within a virtual computer network, among multiple virtual computer networks, etc. For example, a customer can provide customized route mapping information for separate virtual computer network, such that each computing machine that hosts a computing node within a virtual computer network of the customer stores the same route mapping information specific for use with computing nodes in that virtual computer network. In another example, a customer can provide customized route mapping information for separate computing nodes, such that each computing machine that hosts a computing node for the customer stores route mapping information specific to that particular computing node.

In other embodiments, the customer may not identify the specific route for forwarding communication between computing nodes and destination servers, but rather, the customer may select a route based on a price of using the CNS service, or other network characteristics of the CNS service. For example, the customer may choose a cheaper route, where the machines along that route may be subject to more outages (e.g., for maintenance, heavy traffic, slower machines, less available computing resources dedicated to forwarding traffic, etc.). On the other hand, the customer may choose a more expensive route, which may include a more direct path from the computing machine of the originating computing node to the destination (e.g., fewer hops, geographically positioned between the originating machine and destination, etc.), a route that includes more available computing resources for routing incoming traffic, less traffic (which may be achieved through different pricing structures such that higher priced routes have less traffic compared to lower priced routes), etc.

In yet other embodiments, the CNS service may determine the route mapping information 212a-d for each computing node 206a-d or each virtual computer network 202a-b. This determination may be based on various traffic characteristics of the CNS service. For example, different routes can be used and provided to each computing machine 214a-c at predetermined times of the day to reduce bottlenecks or to more evenly distribute traffic among servers. Similarly, the CNS service can determine which routes to employ for different computing nodes based on a number of resources (e.g., memory, processor utilization, number of computing nodes, number of virtual computer networks, etc.) purchased by the customer and traffic characteristics of the CNS service. For example, if one server becomes slow or unresponsive, the CNS service may provide updated route mapping information to the computing machines hosting computing nodes provided to customers who have paid more to use the CNS service.

It should be appreciated that the examples and numbers of virtual computer networks, computing machines, computing nodes, user interfaces, DNS service, etc. illustrated in FIG. 2A are included for exemplary purposes and are non-limiting, and that other numbers and types of computing components or modules may be used in other embodiments.

FIG. 2B illustrates example system 200B, which includes an embodiment of computing machine 214a and DNS server 240. The computing node 206a queries the DNS server 240 for an IP address associated with a DNS domain name to determine a destination IP address of outgoing communications destined for the DNS domain name. For example, a user of the computing node may specify a domain name of a website they want to access. The computing node 206 provides the DNS domain name for the website to the DNS server 240. The DNS server 240 performs a DNS lookup to determine an initial destination IP address that corresponds to the DNS domain name, and provides it back to the computing node 206a. The computing node then generates an outgoing communication (e.g., one or more TCP/IP packets) with the initial destination IP address, which the associated CNS communication manager module 213 on the computing machine receives before the outgoing communication is sent externally to the computing machine.

The CNS communication manager module 213 in this example manages communications between the computing node 206a and other computing nodes, CNS services, third party systems or services via a public network, etc. The CNS communication manager module 213 receives the outgoing communication sent from the computing node 206a with the initial destination IP address. The CNS communication manager module 213 accesses the DNS mapping information 210a stored on the computing machine to obtain a DNS domain name that corresponds to the initial destination IP address of the outgoing communication. This DNS domain name is typically the same as the DNS domain name that the computing node 206a provided to the DNS server 240, although in some embodiments and situations it may be a variation of that originally specified DNS domain name. As discussed elsewhere, entries in the DNS server 240 and/or the DNS mapping information 210c may include TTL values or other expiration information in some embodiments, such that if an entry or other group of DNS information expires, the DNS mapping information 210a on the computing machine 214a is updated accordingly, and the CNS communication manager module 213 may further update the route mapping information 212a to maintain it in a synchronized state with the the DNS mapping information 210a.

Once the CNS communication manager module 213 obtains the DNS domain name from the DNS mapping information 210a, it accesses the route mapping information 212a stored on the computing machine to obtain a modified destination IP address based on the DNS domain name that was obtained from the DNS mapping information 210a, although in other situations other types of target destinations may be identified in the route mapping information, as discussed below and in greater detail elsewhere herein. In various embodiments, the CNS communication manager module 213 may employ regular expressions (e.g., with the use of wildcards within the DNS domain name), hash functions, etc. on the DNS domain name to determine the corresponding route mapping information for that DNS domain name. The CNS communication manager module 213 then modifies the outgoing communication to use the modified destination IP address (e.g., replaces the initial destination IP address with the modified destination IP address, encapsulates the outgoing communication with additional header information that includes the modified destination IP address, etc.), and then forwards the modified outgoing communication externally to the computing machine for routing to that modified destination IP address.

In various embodiments, the route mapping information 212a may map DNS domain names to routing information other than a modified or new destination IP address (of an intermediate destination). For example, the target routing destination may be another DNS domain name, an endpoint (e.g., a computing node or system for a configured tunnel or other established connection that forwards communication between the computing node or an intermediate destination and another online service associated with the initial DNS domain name, such as described in U.S. patent application Ser. No. 14/491,758 filed on Sep. 19, 2014 and entitled "Private Alias Endpoints For Isolated Virtual Networks", which is incorporated by reference herein in its entirety), an edge device (e.g., a computing node or system that connects an internal network of the CNS service to one or more public networks for forwarding the outgoing communication to a destination via the public networks), etc. Such a configured tunnel or other established connection may in some embodiments use encryption to protect information traveling over the tunnel or other connection, such as if so configured, or instead may send some or all such information in an unencrypted form.

It should be appreciated that the computing machine 214a may store the DNS mapping information 210a or the route mapping information 212a in a variety of different formats or data structures. For example, the DNS mapping information 210a and the route mapping information 212a may be stored as separate tables, such that the CNS communication manager module 213 accesses the separate tables to obtain the appropriate information (e.g., the DNS domain name or the modified destination IP address) to modify the outgoing communication. The computing machine 214a may store the DNS mapping information 210a and the route mapping information 212a separately—rather than in a single table or a table of initial destination IP addresses-to-modified destination IP addresses—because the DNS mapping information 210a may be determined by the CNS service to be consistent for one or more customers and the computing nodes (and virtual computer networks) provided to the customers such that they are non-modifiable by the customers, whereas the route mapping information 212a may be customizable by the customer (or dynamically modifiable by the CNS service) for each computing node (or virtual computer network) provided to the customer by the CNS service independent of the DNS mapping information.

It should also be appreciated that the examples and numbers of components and modules illustrated in FIG. 2B are included for exemplary purposes and are non-limiting, and that other numbers and types of computing components or modules may be used in other embodiments.

FIG. 2C illustrates one particular example embodiment of the system illustrated in FIG. 2B. The computing node 206a identifies domain name "ABCD.com" as the destination of a communication outgoing from the computing node 206a. The computing node 206a provides "ABCD.com" to the DNS server 240. The DNS server 240 performs a DNS lookup and returns the initial destination IP address "167.24.101.1" to the computing node 206a. The computing node 206a then generates an outgoing communication with a destination IP address of "167.24.101.1" and provides it to the CNS communication manager module 213. The CNS communication manager module 213 queries the DNS mapping information 210a for the DNS domain name associated with "167.24.101.1." In response, the CNS communication manager module 213 obtains "ABCD.com," which is associated with a plurality of IP addresses as shown in the DNS mapping information 210a (any of which would be resolved back to "ABCD.com" in this example). The CNS communication manager module 213 then queries the route mapping information 212a for the target destination associated with DNS domain name "ABCD.com," and in response, the CNS communication manager module 213 receives a different destination IP address of "167.171.1.0." The CNS communication manager module 213 then modifies the outgoing communication for forwarding to destination "167.171.1.0." Once modified, the CNS communication manager module 213 forwards the modified outgoing communication toward destination IP address "167.171.1.0."

It should also be appreciated that the DNS domain names, IP addresses, DNS mapping information, and route mapping information illustrated in FIG. 2C are included for illustration purposes and are non-limiting, and that other DNS domain names, IP addresses, DNS mapping information, and route mapping information may be used in other embodiments.

Figure 3:
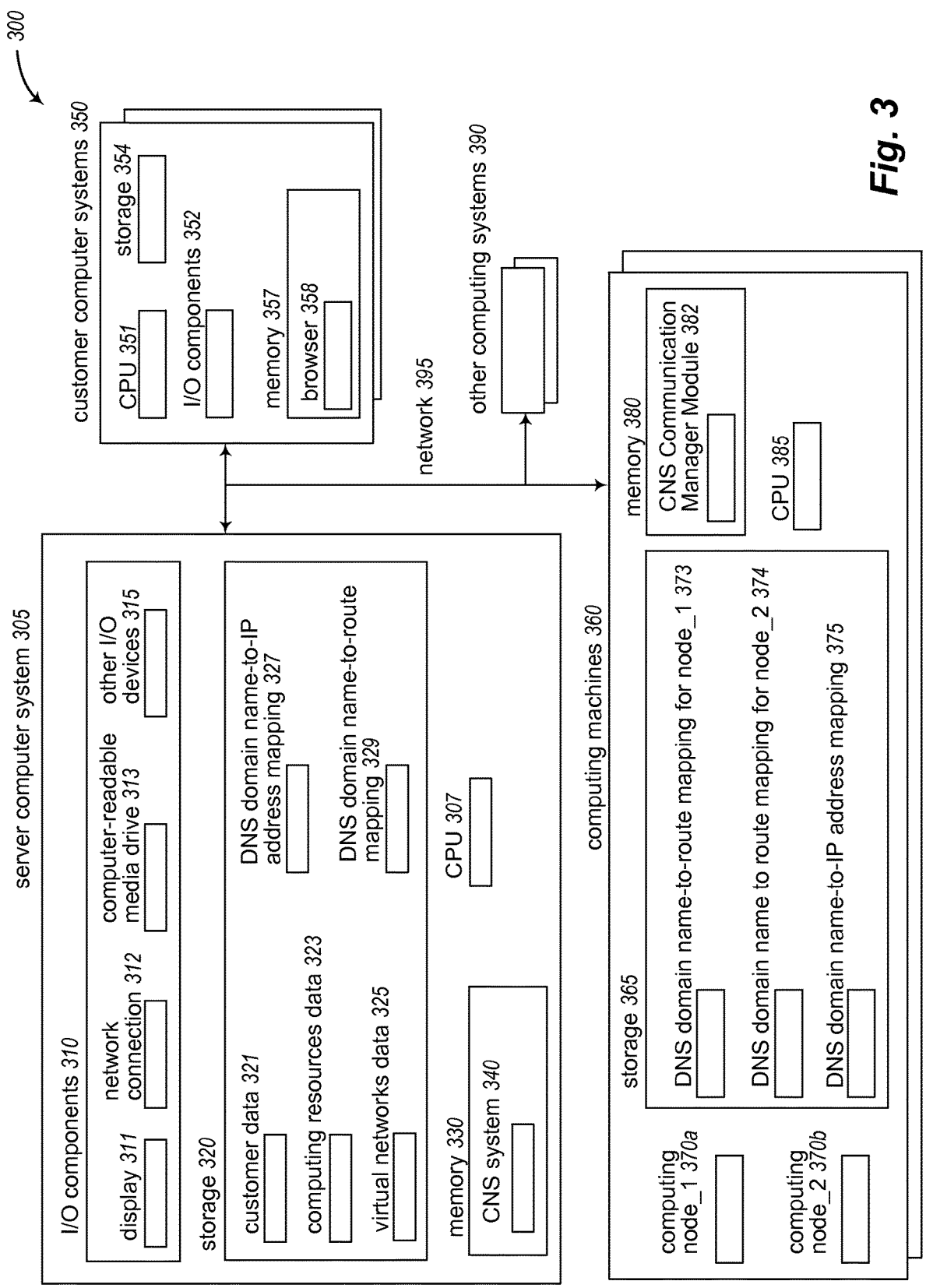
FIG. 3 is a block diagram illustrating example computing systems suitable for executing an embodiment of a system for managing customer-specified routing policies for network-accessible computing resources.

FIG. 3 is a block diagram illustrating example computing systems suitable for performing the described techniques for managing customer-specified routing policies for network-accessible computing resources. In particular, FIG. 3 illustrates example system 300, which includes a server computer system 305, customer computer systems 350, computing machines 360, and other computing systems 390.

The server computing system 305 is suitable for performing automated operations to provide at least some of the described techniques, including to operate a CNS (configurable network service) system 340 that provides an embodiment of the CNS service with which at least part of the described techniques can be used in this embodiment, although in other embodiments the described techniques may be used in other environments that do not include the CNS service.

In the illustrated embodiment, the server computing system 305 has components that include one or more hardware CPU ("central processing unit") computer processors 307, various I/O ("input/output") components 310, storage 320, and memory 330. The illustrated I/O components include a display 311, a network connection 312, a computer-readable media drive 313, and other I/O devices 315 (e.g., a keyboard, a mouse, speakers, etc.). In addition, the customer computer systems 350 may each have components similar to those of the server computing system 305, including one or more CPUs 351, I/O components 352, storage 354, and memory 357, although some details are not illustrated for the computing systems 350 for the sake of brevity. Similarly, the computing machines 360 may each have components similar to those of server computing system 305, including one or more CPUs 385, storage 365, memory 380, and other I/O components, some of which are not illustrated in this example for the sake of brevity. The other computing systems 390 may also each include components that are similar to some or all of the components illustrated with respect to the server computing system 305, including to divide provided hardware resources among multiple hosted virtual machines, but such components are not illustrated in this example for the sake of brevity.

One or more modules of the CNS system 340 (e.g., CNS system manager modules 112, CNS communication manager modules 114, or other CNS modules 117 of FIG. 1, etc.) are stored in memory 330 to provide an embodiment of the CNS service, and in some embodiments each includes various software instructions that, when executed, program one or more of the CPU processors 307 to provide the described functionality. The module(s) of the CNS system 340 interact with the computing machines 360, the customer computing systems 350, and the other computing systems 390 over the network 395 (e.g., via local or private networks within the CNS service, the Internet or World Wide Web, via a private cellular network, etc.).

Various information related to the functionality of the CNS system 340 may be stored in storage 320 and used by the system 340 during its operation, such as the following: customer data 321 related to particular customers (e.g., their account information, specified configuration information for their provided computing resources, etc.); customer virtual networks data 325 related to particular virtual computer networks being provided to customers (e.g., particular computing resources used by the virtual computer networks, specified network topologies and other specified configuration information for the virtual computer networks, etc.); computing resources data 323 related to particular computing resources (e.g., information about other computing resources being provided to customers, information about additional computing resources that are available to be used as such provided computing resources, etc.); DNS domain name-to-IP address mapping information 327 (e.g., for use by a DNS service, not shown, such as DNS service 124 of FIG. 1, DNS service 280 of FIG. 2A, etc.) related to an aggregation of relationships or mappings between one or more DNS domain names and one or more IP addresses for a plurality of different customers; DNS domain name-to-route mapping information 329 related to an aggregation of relationships or mappings between one or more DNS domain names and one or more target routing destinations (which may be specialized for each separate virtual computer network 122, provided computing nodes 127, sub-networks, etc.) for a plurality of customers; etc.

The computing machines 360 may be used to host/manage computing nodes provided to customers of the CNS service, including in situations in which the customers or the CNS service provide specific route mapping information (or DNS mapping information) for use with the computing nodes. The computing machines 360 host or otherwise manage one or more customer computing nodes 370a-b that are allocated storage 365 and CPU 385 resources for use in providing the computing nodes to a customer, and may in some embodiments and situations be hosted virtual machines.

The storage 365 includes DNS domain name-to-IP address mapping information 375 (e.g., in a manner similar to DNS mapping information 210a-d in FIGS. 2A-2C, etc.) for use in performing reverse DNS lookups to obtain domain names for destination IP addresses of outgoing communications from the computing nodes. In some embodiments, the server computer system 305 may periodically (or when data changes) send DNS domain name-to-IP address mapping information 327 to computing machines 360 for storage as DNS domain name-to-IP address mapping information 375.

The storage 365 also includes DNS domain name-to-route mapping information 373 and 374 (e.g., in a manner similar to route mapping information 212a-d of FIGS. 2A-2C, etc.) that is each specific to one of the managed customer computing nodes 370 in this example, for use in determining target route destination(s) for providing communications from a computing node to a specified DNS domain name. For example, the storage 365 includes DNS domain name-to-route mapping information 373 for use with outgoing communications from customer computing node 370a, and DNS domain name-to-route mapping information 374 for use with outgoing communications from customer computing node 370b.

The computing machines 360 also each include a CNS communication manager module 382 (e.g., in a manner similar to CNS communication manager module 213 of FIGS. 2B-2C, etc.) stored in memory 380 to manage communications of the computing nodes managed or hosted by the corresponding computing machine The CNS communication manager module 382 accesses the DNS domain name-to-IP address mapping information 375 to obtain a DNS domain name for an outgoing communication based on the destination IP address of the outgoing communication. The CNS communication manager module 382 further accesses DNS domain name-to-route mapping information 373 or 374 (depending on the originating computing node 370a or 370b of the outgoing communication), and modifies and forwards the outgoing communication based on the route mapping information that corresponds to the DNS domain name that was obtained from the DNS domain name-to-IP address mapping information 375. The CNS communication manager module 382 of a computing machine 360 may also interact with the server computer system 305 over the network 395 to obtain a current copy of the DNS domain name-to-IP address mapping information 327 or the DNS domain name-to-route mapping information 329 for the computing nodes hosted by that corresponding computing machine 360.

The other computing systems 390 may be computing systems that are used by the CNS service to provide virtual computer networks and other computing resources, such as in one or more data centers, not shown, or to provide other functionality or services for or accessible to the CNS service, including a DNS service external to the CNS service.

The customer computing systems 350 and other computing systems 390 may be executing various software as part of interactions with the module(s) of system 340 or customer computing nodes 370a-b. For example, customer computer systems 350 may each be executing software in memory 357 to interact with system 340, such as a Web browser 358 and/or one or more specialized client-side programs (not illustrated) (e.g., a customer module of the CNS service, such as a specialized shell program), including to request computing resources from the CNS service and to interact with or otherwise use such computing resources, which may in some embodiments be provided by computing machines 360 as customer computing nodes 370*a-b*. The software executing on the customer computer systems 350 may further participate in providing some of the described techniques, including to enable a user to provide specific mappings between DNS domain names and IP addresses or specific mappings between DNS domain names and routing information (e.g., specific routing destination address, routing endpoint, etc.).

It should be appreciated that computing systems 305, 350, and 390 and computing machines 360 are merely illustrative and are not intended to limit the scope of the present invention. The computing systems may instead each include multiple interacting computing systems or devices, and the computing systems may be connected to other devices that are not illustrated, including through one or more networks such as the Internet, via the Web, or via private networks (e.g., mobile communication networks, etc.). More generally, a computing system or other computing node may comprise any combination of hardware or software that may interact and perform the described types of functionality, including, without limitation, desktop or other computers, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate communication capabilities. In addition, the functionality provided by the CNS system 340 or CNS communication manager module 382 may in some embodiments be distributed in one or more modules, as described elsewhere herein.

It should also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the CNS system 340 or CNS Communication Manager Module 382) or data structures, such as by execution of software instructions of the one or more software programs and/or by storage of such software instructions and/or data structures. Furthermore, in some embodiments, some or all of the systems or modules may be implemented or provided in other manners, such as by using means that are implemented at least partially or completely in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, modules and data structures may also in some embodiments be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
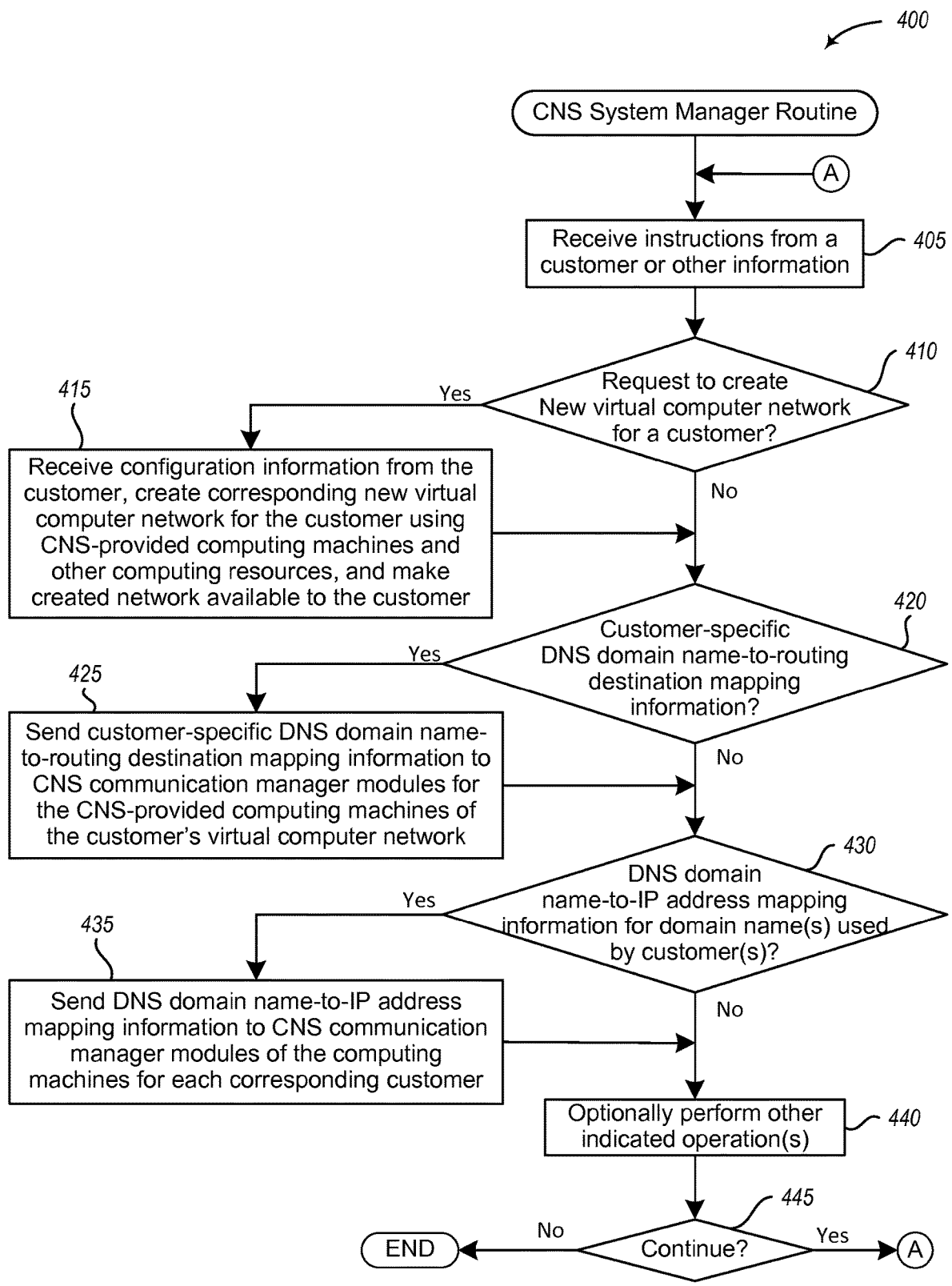
FIG. 4 illustrates a flow diagram of an example embodiment of a Configurable Network Service (CNS) System Manager routine.

FIG. 4 illustrates a flow diagram of an example embodiment of a Configurable Network Service (CNS) System Manager routine 400. The routine may be provided by, for example, execution of the CNS system 340 of FIG. 3, the modules 112, 114 and 117 of FIG. 1A, and/or the CNS modules discussed in FIGS. 2A-2C and elsewhere herein, such as to perform the described techniques for providing customer-configurable managed computing nodes and virtual computer networks to customers and for providing customer-specific DNS-based routing for network-accessible computing resources. While the described techniques for providing DNS-based routing for network-accessible computing resources and associated functionality are discussed in this example as being at least supported by the CNS service, it will be appreciated that such functionality may be provided by a distinct system from the CNS service in other embodiments, such as in conjunction with one or more separate online services or otherwise with respect to provided computing resources and associated functionality.

In the illustrated embodiment, the routine 400 begins in block 405, where instructions from a customer or other information are received. In some embodiments, the instructions from the customer or the other received information may include a request to create a new virtual computer network, information regarding customer-specific DNS domain name-to-routing destination mapping information, DNS domain name-to-IP address mapping information for domain name(s) used by the customer or customers, etc.

The routine continues to decision block 410 to determine whether a request received in block 405 is to create a new virtual computer network for a customer, and if so the routine 400 continues to block 415.

In block 415, the routine receives configuration information from the customer and determines whether the customer is authorized for the request (e.g., based on providing required fees, if any; based on previous registration activities of the customer with the CNS service; etc.). If the customer is not authorized for the request, then the request is declined and the routine 400 continues to decision block 420, optionally after a corresponding error message is generated and provided to the customer. If the customer is authorized, then the routine 400 creates a corresponding new virtual computer network for the customer using computing machines and other computing resources provided by the CNS service, and makes the created virtual computer network available to the customer. Additional details related to providing virtual computer networks to customers are described elsewhere herein.

After block 415, or if it is instead determined in block 410 that a request is not received in block 405 to create a new virtual computer network for a customer, the routine 400 continues to decision block 420 to determine whether information is received in block 405 to create or otherwise modify customer-specific DNS domain name-to-routing destination mapping information (e.g., route mapping information 212a-d of FIGS. 2A-2C, DNS domain name-to-route mapping 329 of FIG. 3, DNS domain name to route mapping information 373 or 374 of FIG. 3, etc.). In some embodiments, the customer may provide the specific DNS domain name-to-routing destination mapping information, while in other embodiments the CNS system may determine at least some such DNS domain name-to-routing destination mapping information automatically for the customer (such as based on other preference or configuration information specified by the customer), although such automated determination of DNS domain name-to-routing destination mapping information is not illustrated in FIG. 4. If specific DNS domain name-to-routing destination mapping information is provided, the routine 400 continues to block 425.

In block 425, the routine 400 receives and stores the customer-specific DNS domain name-to-routing destination mapping information, and further sends at least some such information to CNS communication manager modules (e.g., CNS communication manager modules 213 of FIG. 2B or CNS communication manager module 382 of FIG. 3) for CNS-provided computing machines (e.g., computing machines 214a-c of FIGS. 2A-2B or computing machines 360 of FIG. 3) of the customer's virtual computer network (e.g., virtual computer networks 202a-b of FIG. 2A). Additional details related to providing the DNS domain name-to-routing destination mapping information to CNS communication manager modules are described elsewhere herein.

After block 425, or if it is instead determined in block 420 that information is not received in block 405 to create or otherwise modify customer-specific DNS domain name-to-routing destination mapping information, the routine 400 continues to decision block 430 to determine whether information is received in block 405 to indicate DNS domain name-to-IP address mapping information for domain name(s) used by one or more customers. In some embodiments, the DNS domain name-to-IP address mapping information may be provided by the customer or provided by the CNS service. If DNS domain name-to-IP address mapping information is received, the routine 400 continues to block 435.

In block 435, the routine 400 receives and stores the DNS domain name-to-IP address mapping information, and further sends at least some such information to CNS communication manager modules (e.g., CNS communication manager modules 213 of FIG. 2B or CNS communication manager module 382 of FIG. 3) for CNS-provided computing machines (e.g., computing machines 214a-c of FIGS. 2A-2B or computing machines 360 of FIG. 3) of the customer's virtual computer network (e.g., virtual computer networks 202a-b of FIG. 2A). Additional details related to providing the DNS domain name-to-IP address mapping information to CNS communication manager modules are described elsewhere herein.

After block 435, or if it is instead determined in block 430 that information is not received in block 405 indicating DNS domain name-to-IP address mapping information for domain name(s) for one or more customers, the routine 400 continues to block 440.

In block 440, routine 400 performs one or more other indicated operations (if any) as appropriate. For example, in some embodiments, the routine may receive requests to manipulate provided computing resources of one or more computing nodes of a virtual computer network provided to the customer the CNS service, or to perform updates or changes requested by customers to modify one or more virtual computer networks provided to the customer, and if so may perform activities to satisfy such requests if they are authorized. Other types of operations performed with respect to block 440 may include various administrative operations for the CNS service, such as, for example, performing operations to register new customers, or determining and storing information about authorizations for particular customers and users (e.g., based on information from customers to specify authorized users for the customer with corresponding authorized activities, based on information from an operator of the CNS service to specify system administrator users employed by the CNS service or other users who are authorized representatives of the CNS service with corresponding authorized activities, etc.), such as for later use in determining whether to authorize requests on behalf of such clients or other users.

After block 440, the routine 400 continues to decision block 445 to determine whether to continue the routine and process additional information, such as until an explicit indication to terminate is received. If it is determined to continue, routine 400 returns to block 405, otherwise, the routine 400 ends.

Figure 5A:
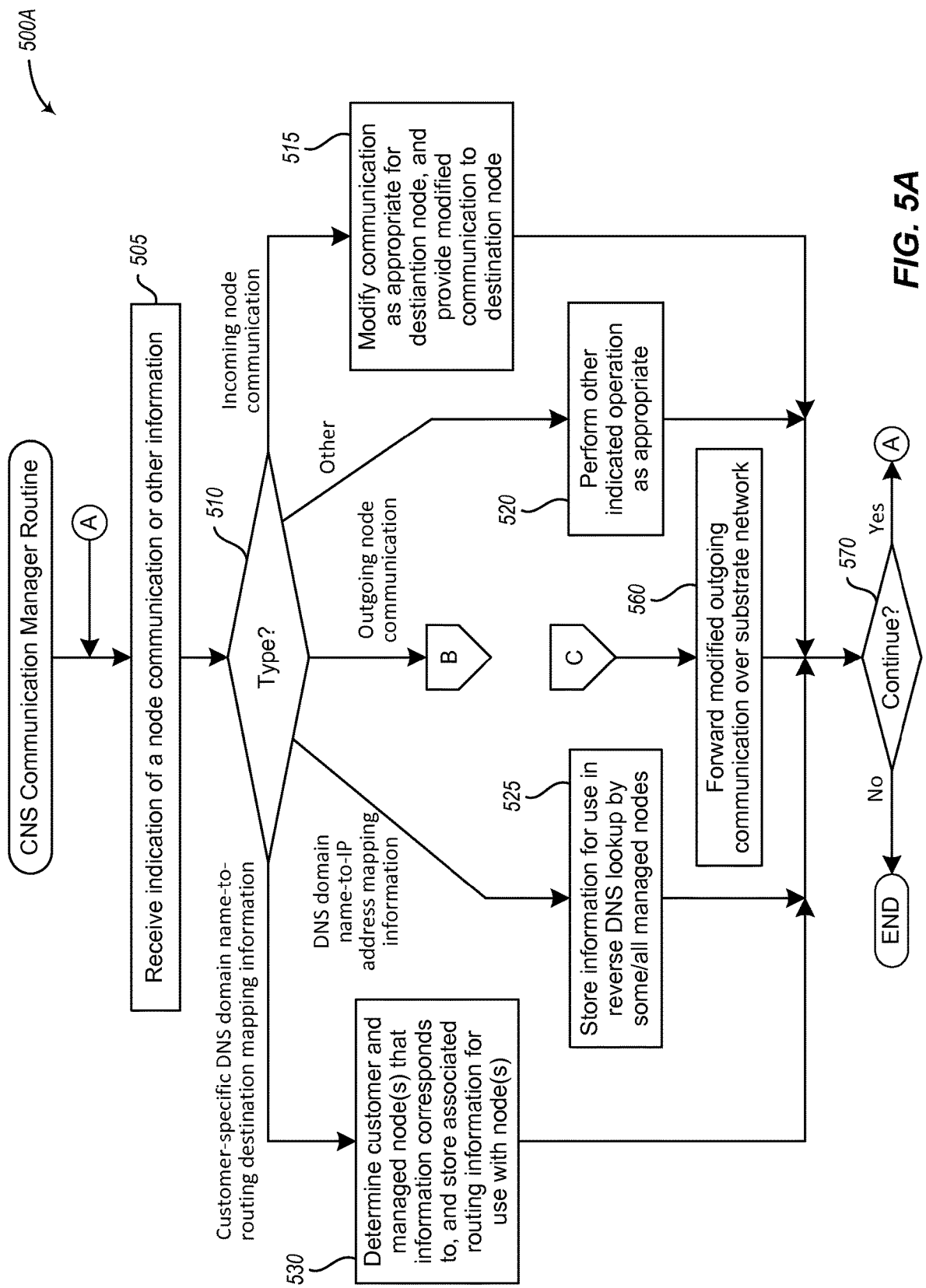
FIGS. 5A-5B illustrate a flow diagram of an example embodiment of a CNS Communication Manager Module routine.
Figure 5B:
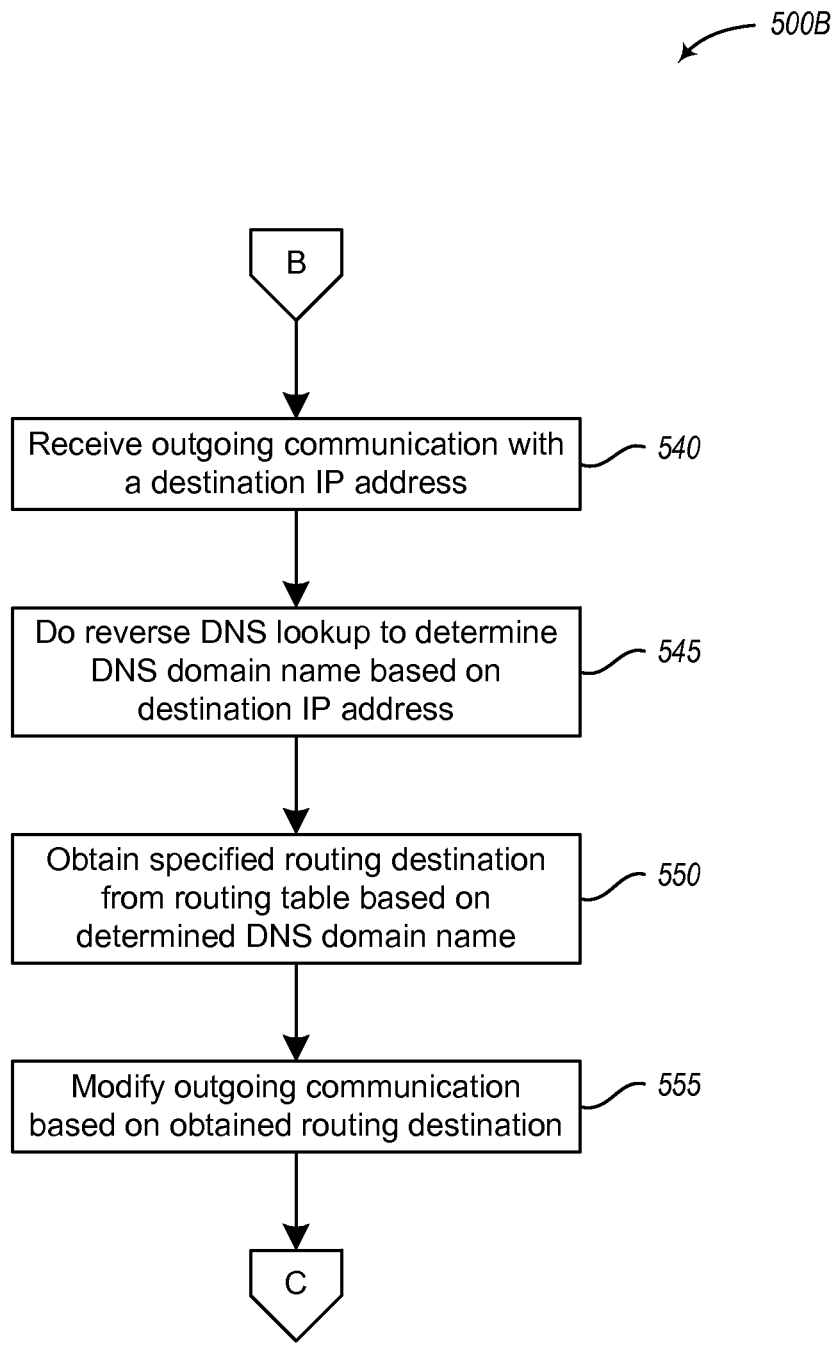

FIGS. 5A-5B illustrate a flow diagram of an example embodiment of a CNS Communication Manager Module routine 500A-B. The routine may be provided by, for example, execution of the CNS communication manager module 213 of FIG. 2, CNS communication manager modules 114 of FIG. 1, and/or CNS communication manager module 382 of FIG. 3, such as to perform some or all of the described techniques for managing customer-specified routing policies for network-accessible computing resources. While the described techniques for managing customer-specified routing policies for network-accessible computing resources are discussed in this example as being provided by the CNS service, it will be appreciated that such functionality may be provided by a distinct system from the CNS service in other embodiments, such as in conjunction with one or more separate online services or otherwise with respect to provided computing resources and associated functionality.

Starting with the illustrated embodiment in FIG. 5A, the routine begins in block 505, where an indication of a computing node communication or other information is received. Such received information may be incoming node communications, outgoing node communications, DNS domain name-to-IP address mapping information, customer-specific DNS domain name-to-routing destination mapping information, etc. In some embodiments, an outgoing communication may include a plurality of packets, in which case each packet may be processed individually or a group of packets associated with a single communication may instead be processed together.

After block 505, the routine continues to decision block 510 to determine what type of communication or information is received in block 505 and processed accordingly. If the communication received in block 505 is an incoming node communication, the routine continues from decision block 510 to block 515 to modify the communication as appropriate for its destination node (e.g., a managed computing node hosted by the associated computing machine executing the CNS communication manager routine), and to provide the modified communication to the destination node.

If the information received in block 505 is customer-specific DNS domain name-to-routing destination mapping information, the routine continues from decision block 510 to block 530 to determine what customer(s) and what managed computing node(s) (e.g., managed computing nodes hosted by the associated computing machine that is executing the CNS communication manager routine) are associated with the received information. The routine then stores the customer-specific DNS domain name-to-routing destination mapping information, including to provide the information to the associated computing machine (e.g., route mapping information 212a of FIG. 2B, etc.) for use with the determined customer(s) and managed computing node(s).

If the communication received in block 505 is DNS domain name-to-IP address mapping information, the routine continues from decision block 510 to block 525 to store the DNS domain name-to-IP address mapping information, including to provide the information to the associated computing machine (e.g., DNS mapping information 210a of FIG. 2B, etc.) for use in reverse DNS lookups by some or all of the managed computing nodes of the associated computing machine.

If the communication received in block 505 is an outgoing node communication, the routine continues from decision block 510 to block 540 illustrated in FIG. 5B, described below.

If the communication received in block 505 is some other communication or information, the routine continues from decision block 510 to block 520 to perform one or more other indicated operations as appropriate. For example, in some embodiments, the routine may monitor DNS calls from managed computing nodes to other DNS services (e.g., external third-party DNS service, etc.) to obtain DNS-related information to build up information to perform reverse DNS lookups (e.g., DNS domain names sent in resolution requests to the DNS service, DNS service responses that indicate particular destination IP addresses to use with particular DNS domain names, etc.), and store the obtained information similar to what is described in block 525, whether in a customer-specific manner (e.g., based on computing nodes controlled by that customer), computing node-specific manner, for all customers, etc. In other examples, the routine may receive requests to perform updates or changes requested by the customer to modify one or more virtual computer networks provided to the customer, and if so may perform activities to satisfy such requests if they are authorized, or to perform other administrative operations associated with the management of communications for computing node(s) managed by the associated computing machine.

If the communication received in block 505 is an outgoing node communication, the routine continues from decision block 510 to block 540 of FIG. 5B. In block 540, the routine receives from a managed computing node an outgoing communication with a destination IP address. After block 540, the routine continues to block 545 to perform a reverse DNS lookup (e.g., using DNS mapping information 210a of FIG. 2B or DNS domain name-to-IP address mapping 375 of FIG. 3, etc.) to determine a DNS domain name based on the destination IP address of the outgoing communication. Additional details related to performing a reverse DNS lookup are described elsewhere herein.

After block 545, the routine continues to block 550 to obtain a specified routing destination from a routing table (e.g., routine mapping information 212a of FIG. 2B or DNS domain name-to-route mapping information 373 or 374 for the computing node providing the outgoing communication, etc.) based on the determined DNS domain name. Additional details related to obtaining a specified routing destination based on a DNS domain name are described elsewhere herein.

After block 550, the routine continues to block 555 to modify the outgoing communication based on the obtained routing destination (e.g., by modifying the destination address of the outgoing communication to be an address of the specified routing destination, by encapsulating the outgoing communication to include additional header information with the specified routing destination, etc.).

After block 550, the routine returns to FIG. 5A in block 560, where the routine forwards the modified outgoing communication toward its corresponding destination, such as over a substrate intermediate network toward the final destination, optionally via one or more intermediate destination computing nodes.

While not illustrated here, in other embodiments various additional types of processing may be performed for outgoing node communications, such as to verify that the communications are valid or otherwise authorized in various ways (e.g., to verify that the sending computing node is authorized to send communications to the destination computing node, such as based on being associated with the same entity or part of the same virtual computer network, based on the sending and destination computing nodes being associated with different entities that are authorized to inter-communicate, based on the type of communication or other information specific to the communication, etc.), to perform actions in accordance with specified failure behavior for an unavailable computing node to which the communication would otherwise be sent, etc.

After blocks 515, 520, 525, 530, or 560, the routine continues to decision block 570 to determine whether to continue and process additional information, such as until an explicit indication to terminate is received. If it is determined to continue, the routine returns to block 505, and if not the routine ends. In various embodiments, the CNS Communication Manager Module routine 500A may be employed as multiple different routines or include multiple sub-routines. For example, one or more routines or sub-routines may process incoming and/or outgoing node communications in a manner similar to what is described with respect to their corresponding illustrated branches. One or more other routines or sub-routines may process the customer-specific DNS domain name-to-routing destination mapping information and/or the DNS domain name-to-IP address mapping information in a manner similar to what is described with respect to their corresponding illustrated branches.

As described herein, DNS domain name-to-route destination mapping information (or DNS domain name-to-IP address mapping information) may be configured and customized by a customer or automatically determined by the CNS service. Other aspects of the CNS service may also be configured, such as, for example, as previously discussed, virtual computer networks that are provided for customer by a CNS service may be configured in various manners in various embodiments. For example, network addresses may be configured for a provided computer network, such as by the customer specifying one or more address ranges (e.g., a Classless Inter-Domain Routing ("CIDR") address block) or other groups of network addresses for the provided computer network, with at least some of the specified network addresses being used for the computing nodes of the provided computer network or for one or more online services integrated with the provided computer network, and with those specified network addresses optionally being a subset of network addresses used by an existing remote customer computer network if the provided computer network is configured to be an extension to the remote customer computer network.

Such configured network addresses may in some situations be virtual or private network addresses that are not directly addressable from computing systems on the public network 102 of FIG. 1 (e.g., if the existing remote customer computer network and the corresponding provided network extension use network address translation techniques or virtual networking techniques for the customer computer network and its provided network extension), while in other situations at least some of the configured network addresses may be external public network addresses that are directly addressable from computing systems on the public network 102 (e.g., a public network address that is a static Internet-routable IP address or other non-changing network address).

In other embodiments, the CNS service may automatically select network addresses to be assigned to at least some computing nodes of at least some provided computer networks, such as based on network addresses that are available for use by the CNS service, based on selecting network addresses that are related to network addresses used by remote existing computer networks corresponding to the provided computer networks, etc. Furthermore, if two or more of the computer networks provided by the CNS service are configured to enable inter-communications between the provided computer networks (e.g., for two or more computer networks provided to a single customer, such as for different departments or groups within a single organization; for two or more computer networks provided to two or more distinct customers; etc.), the CNS service may in some embodiments automatically select network addresses to be used for at least some computing nodes of those provided computer networks to facilitate the inter-communications, such as by using different network addresses for the various provided computer networks.

In addition, in at least some embodiments in which the CNS service provides virtual networks to customer, such as by using overlay networks on a substrate network, each customer may be allowed to specify any network addresses to be used for their provided computer networks, even if multiple customer specify the same or overlapping network addresses for their respective provided computer networks—in such embodiments, the CNS service manages the network addresses distinctly for each customer, such that a first customer may have a first computing node associated with a particular specified network address for the first customer's provided computer network, while a distinct second customer may have a distinct second computing node associated with the same particular specified network address for the second customer's provided computer network. Once network addresses are configured or otherwise determined for a provided computer network, the CNS service may assign the network addresses to various of the computing nodes selected for the provided computer network, such as in a random manner, by using DHCP ("Dynamic Host Configuration Protocol") or other techniques for dynamic assignment of network addresses, etc.

Furthermore, in at least some embodiments, the CNS service may provide available computing nodes in multiple geographical locations (e.g., in multiple geographically distributed data centers), and the configuration information specified by a customer for a provided computer network may further indicate one or more geographical locations in which computing nodes of the provided computer network are to be located (e.g., to provide fault tolerance among the computing nodes of a provided computer network by having them located in multiple geographical locations), or may otherwise provide information about preferences or requirements of how the computing nodes of the provided computer network are to interoperate that is used by the CNS service to select one or more such geographical locations. Such preferences or requirements may include, but are not limited to, minimum or maximum network latency or bandwidth for computing node intercommunications; minimum or maximum network proximity between computing nodes; minimum or maximum geographic proximity between computing nodes; having local access to particular resources or functionality that is not available in all such geographic locations; having specified locations relative to other external computing systems, such as to a remote computer network of the client and/or to a remote resource service; constraints or other preferences based on the cost of obtaining use of particular computing nodes and/or for particular types of interactions with particular computing nodes, such as costs associated with providing data to and/or from those computing nodes; etc. These preferences or requirements may also be used to determine routing information or intermediate destinations for DNS domain name-to-route mapping information as described elsewhere herein.

In addition, a virtual computer network may in some embodiments be provided as an overlay network that uses one or more intermediate physical networks as a substrate network, and one or more such overlay virtual computer networks may be implemented over the substrate network in various ways in various embodiments. For example, in at least some embodiments, communications between nodes of an overlay virtual computer network are managed by encoding and sending those communications over the substrate network without encapsulating the communications, such as by embedding virtual network address information for a computing node of the virtual computer network (e.g., the destination computing node's virtual network address) in a larger physical network address space used for a networking protocol of the one or more intermediate physical networks, while in other embodiments the communications are encoded in other manners (e.g., by storing virtual network address information from the pre-encoded communication in one or more header fields of the encoded communication or otherwise in a manner associated with the encoded communications, such as if the overlay virtual computer network and underlying substrate network use the same networking protocol). As one illustrative example, both the virtual computer network and substrate computer network may be implemented using the same network addressing protocol (e.g., IPv4 or IPv6), and data transmissions sent via the provided overlay virtual computer network using virtual network addresses may be modified to use different physical network addresses corresponding to the substrate network while the transmissions are sent over the substrate network, but with the original virtual network addresses being stored in the modified data transmissions or otherwise tracked so that the data transmissions may be restored to their original form when they exit the substrate network. In other embodiments, at least some of the overlay computer networks may be implemented using encapsulation of communications.

In addition, various embodiments may provide mechanisms for client entities to interact with an embodiment of the CNS service for the purpose of configuring computing nodes. For example, some embodiments may provide an interactive console (e.g. a client application program providing an interactive user interface, a Web browser-based interface, etc.) from which users can manage the creation or deletion of virtual computer networks, the configuration of network topology information for virtual computer networks, and the specification of virtual network membership, as well as more general administrative functions related to the operation and management of hosted applications (e.g., the creation or modification of user accounts; the provision of new applications; the initiation, termination, or monitoring of hosted applications; the assignment of applications to groups; the reservation of time or other system resources; etc.). In some embodiments, some or all of the functionality of an embodiment of the CNS service may be provided in exchange for fees from users or other entities acting as clients of the CNS service, and if so the mechanisms for such clients to interact with an embodiment of the CNS service may include functionality for users and other entities to provide payment and payment-related information, as well as to monitor corresponding payment information. In addition, some embodiments may provide an API that allows other computing systems and programs to programmatically invoke at least some of the described functionality, such as APIs provided by libraries or class interfaces (e.g., to be invoked by programs written in C, C++, or Java) or otherwise, and/or using network service protocols such as via Web services.

It should also be appreciated that, although in some embodiments the described techniques are employed in the context of a data center housing multiple physical machines hosting virtual machines, other implementation scenarios are also possible. For example, the described techniques may be employed in the context an organization-wide network or networks operated by a business or other institution (e.g. university) for the benefit of its employees and/or members. Alternatively, the described techniques could be employed by a network service provider to improve network security, availability, and isolation.

It should also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art should appreciate that in other embodiments the operations may be performed in other orders and in other manners. Those skilled in the art should also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it should be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A non-transitory computer-readable medium with stored contents that cause one or more computing systems to perform automated operations including at least:
   receiving, by a web service, configuration information from a customer for use with a virtual machine provided to the customer by the web service, wherein the configuration information includes a mapping of a specified Domain Name System (DNS) domain name to a specified intermediate routing destination;
   storing, on a computing machine that hosts the virtual machine, a routing table entry that maps the specified DNS domain name to the specified intermediate routing destination;
   receiving, by a communication manager executing on the computing machine, an outgoing communication from the virtual machine with a destination specified by a destination Internet Protocol (IP) address;
   performing, by the communication manager, a reverse DNS lookup to determine that the destination IP address is one of a plurality of IP addresses associated with the specified DNS domain name; and
   forwarding, by the communication manager and based on the stored routing table entry, the outgoing communication to the specified intermediate routing destination as the destination of the outgoing communication.

2. The non-transitory computer-readable medium of claim 1 wherein the stored contents include software instructions that, when executed, further cause the one or more computing systems to, before the performing of the reverse DNS lookup, store, on the computing machine, a DNS lookup table with a mapping of the plurality of IP addresses to the specified DNS domain name, and wherein the performing of the reverse DNS lookup includes using the stored DNS lookup table on the computing machine without accessing any other computing systems.

3. The non-transitory computer-readable medium of claim 1 wherein the stored contents include software instructions that, when executed, further cause the one or more computing systems to modify, by the communication manager and before the forwarding of the outgoing communication to the specified intermediate routing destination, the outgoing communication by encapsulating the outgoing communication with destination information corresponding to the specified intermediate routing destination.

4. The non-transitory computer-readable medium of claim 1 wherein the stored contents include software instructions that, when executed, further cause the one or more computing systems to:
   receive, by the web service, second configuration information from a second customer that includes a second mapping of the specified DNS domain name to a second routing destination different from the specified intermediate routing destination; and
   forward, based at least in part on the second configuration information, a second outgoing communication for the second customer that has a specified destination associated with the specified DNS domain name to the second routing destination, wherein the second routing destination is configured to manage the modified second outgoing communication in a second manner that is configured for the second customer and that is different from the manner configured for the customer at the specified intermediate routing destination.

5. A computer-implemented method comprising:
creating, on a computing machine that provides a first computing node to a user, user-specific mapping information that locally maps, for the first computing node, a Domain Name System (DNS) domain name to a user-specified Internet Protocol (IP) address for a target destination;
receiving, by a communication manager that is executing on the computing machine, an outgoing communication from the first computing node that includes a public IP address as a destination of the outgoing communication;
determining, by the communication manager, that the public IP address is associated with the DNS domain name, and modifying the outgoing communication based on the user-specific mapping information to use the user-specified IP address as the destination of the outgoing communication in place of the public IP address; and
forwarding, by the communication manager, the modified outgoing communication to the user-specified IP address associated with the target destination.

6. The computer-implemented method of claim 5 wherein the determining that the public IP address is associated with the DNS domain name includes performing, by the communication manager and using other mapping information that is maintained by a publicly available DNS server and that associates the DNS domain name with the public IP address, a reverse DNS lookup using the public IP address to identify the DNS domain name associated with the public IP address.

7. The computer-implemented method of claim 6 further comprising, before the determining that the public IP address is associated with the DNS domain name, receiving, by the communication manager, a DNS lookup call by the first computing node that specifies the DNS domain name, and wherein a response to the DNS lookup call by a publicly available DNS server specifies the public IP address.

8. The computer-implemented method of claim 6 further comprising:
receiving, by the communication manager, the other mapping information maintained by the publicly available DNS server, wherein the other mapping information maps the DNS domain name to a plurality of public IP addresses used by a distributed online service with which the DNS domain name is associated; and
storing, on the computing machine, the other mapping information,
and wherein the performing of the reverse DNS lookup includes determining, by the communication manager and based on the stored other mapping information, that the public IP address is one of the plurality of public IP addresses.

9. The computer-implemented method of claim 8 wherein the target destination is a second DNS domain name that corresponds to one part of a plurality of parts of the distributed online service.

10. The computer-implemented method of claim 8 wherein the user-specified IP address associated with the target destination is one of the plurality of public IP addresses that is different from the public IP address.

11. The computer-implemented method of claim 6 further comprising:
monitoring, by the communication manager, communications between the first computing node and at least one other computing node to obtain the DNS domain name and a plurality of public IP addresses used by a distributed online service with which the DNS domain name is associated;
creating, based on the monitored communications, other mapping information, including information that maps the DNS domain name to the plurality of public IP addresses; and
storing, on the computing machine, the other mapping information,
and wherein the performing of the reverse DNS lookup includes determining, by the communication manager and based on the stored other mapping information, that the public IP address is one of the plurality of public IP addresses.

12. The computer-implemented method of claim 5 wherein the creating of the user-specific mapping information includes receiving configuration information from the user for use with the first computing node, and storing the created user-specific mapping information on the computing machine for use in managing communications of the first computing node.

13. The computer-implemented method of claim 5 further comprising, before the creating of the user-specific mapping information:
receiving configuration information from the user for a virtual computer network; and
assigning, by a web service operated in a service provider environment, a plurality of computing nodes to be part of the virtual computer network for the user, wherein the first computing node is one of the plurality of computing nodes, and
wherein the creating of the user-specific mapping information includes using the configuration information for the virtual computer network.

14. The computer-implemented method of claim 13 wherein the configuration information from the user further specifies multiple subnets of the virtual computer network that each includes a distinct subset of the plurality of computing nodes, wherein the first computing node is part of a first subnet of the multiple subnets, and wherein the creating of the user-specific mapping information further uses information specified by the user for use with the first subnet.

15. The computer-implemented method of claim 5 wherein the first computing node is a virtual machine, and wherein the DNS domain name is assigned to a web service that is accessible to the computing machine via an internal network.

16. The computer-implemented method of claim 5 wherein the DNS domain name is assigned to a web service that is accessible to the computing machine via one or more public networks, wherein the target destination is an edge device that connects an internal network used by the computing machine to the one or more public networks, and wherein the forwarding of the modified outgoing communication to the target destination includes forwarding the modified outgoing communication over the internal network to the edge device, to enable the modified outgoing communication to be further forwarded to the web service over the one or more public networks.

17. The computer-implemented method of claim 5 further comprising:
storing, on the computing machine, other mapping information that is maintained by a publicly available DNS server, wherein the other mapping information associates the DNS domain name with one or more IP addresses that include the public IP address;

storing, on the computing machine, the created user-specific mapping information that maps the DNS domain name to the user-specified IP address for the target destination;

determining that at least some of the stored other mapping information on the computing machine has expired; and in response to the determining that the at least some stored other mapping information has expired,
updating the at least some stored other mapping information on the computing machine; and
updating at least some of the stored created user-specific mapping information on the computing machine to correspond to the updated at least some stored other mapping information.

18. A system, comprising:
one or more hardware processors of one or more computing systems; and
one or more memories with stored software instructions that, when executed by at least one hardware processor of the one or more hardware processors, cause the system to manage outgoing communications by:
storing user-specific information configured by a user that is associated with a computing node implemented on at least one of the one or more computing systems, wherein the user-specific information maps a Domain Name System (DNS) domain name to a user-defined route over one or more computer networks via which to route communications from the computing node that are directed to the DNS domain name;
receiving an outgoing communication from the computing node with a destination specified by a destination IP address;
determining, based at least in part on the stored user-specific information and on the destination IP address being associated with the DNS domain name, to change the destination for the outgoing communication to use the user-defined route; and
forwarding, over the one or more computer networks, and based on the determining and the stored user-specific information, the outgoing communication to the changed destination using the user-defined route.

19. The system of claim 18 wherein the one or more memories further include software instructions that, when executed, cause the at least one hardware processor to, before forwarding the modified outgoing communication to the changed destination, modify the outgoing communication to use a user-specified destination Internet Protocol (IP) address associated with the user-defined route.

20. The system of claim 19 wherein the user-specified destination IP address is a specified intermediate routing destination, and wherein the user-defined route further includes a final destination that is different from the specified intermediate routing destination.

* * * * *